(12) United States Patent
Mohr et al.

(10) Patent No.: US 11,422,237 B2
(45) Date of Patent: Aug. 23, 2022

(54) PYRAMIDAL MIRROR LASER SCANNING FOR LIDAR

(71) Applicant: Seagate Technology LLC, Cupertino, CA (US)

(72) Inventors: Dan Mohr, Roseville, MN (US); Zoran Jandric, St. Louis Park, MN (US); Kevin A. Gomez, Eden Prairie, MN (US); Raghu Ambekar Ramachandra Rao, Bloomington, MN (US)

(73) Assignee: Seagate Technology LLC, Fremont, CA (US)

( * ) Notice: Subject to any disclaimer, the term of this patent is extended or adjusted under 35 U.S.C. 154(b) by 892 days.

(21) Appl. No.: 16/248,555

(22) Filed: Jan. 15, 2019

(65) Prior Publication Data
US 2020/0225328 A1    Jul. 16, 2020

(51) Int. Cl.
*G01S 7/481* (2006.01)
*G02B 26/12* (2006.01)

(52) U.S. Cl.
CPC .......... *G01S 7/4817* (2013.01); *G02B 26/124* (2013.01)

(58) Field of Classification Search
CPC .... G01S 7/4811; G01S 7/4813; G01S 7/4817; G01S 17/10; G02B 26/101; G02B 26/105; G02B 26/124; G02B 26/125; G02B 26/126; G02B 26/129
See application file for complete search history.

(56) References Cited

U.S. PATENT DOCUMENTS

| | | | |
|---|---|---|---|
| 4,326,799 A * | 4/1982 | Keene | G01B 11/26 244/3.16 |
| 5,249,046 A | 9/1993 | Ulich et al. | |
| 5,262,887 A * | 11/1993 | Feinberg | G02B 26/124 250/236 |
| 10,324,170 B1 * | 6/2019 | Engberg, Jr. | G02B 26/0816 |
| 2011/0235018 A1 | 9/2011 | Mori et al. | |
| 2016/0238385 A1 | 8/2016 | Ohtomo et al. | |
| 2019/0063920 A1 * | 2/2019 | Nishita | G01S 7/4817 |
| 2019/0120941 A1 * | 4/2019 | Qiu | G01S 7/4817 |
| 2019/0154805 A1 * | 5/2019 | Ohtomo | G01S 7/4972 |

FOREIGN PATENT DOCUMENTS

| | | |
|---|---|---|
| CN | 105807284 A * | 7/2016 |
| EP | 3173816 B1 | 9/2019 |
| WO | 2001075388 A1 | 10/2001 |
| WO | 2004099849 A1 | 11/2004 |

* cited by examiner

*Primary Examiner* — Luke D Ratcliffe
*Assistant Examiner* — Woohyeong Cho
(74) *Attorney, Agent, or Firm* — Faegre Drinker Biddle & Reath LLP

(57) ABSTRACT

An apparatus includes a detector and a light source configured to emit light. The apparatus further includes a disk with a set of prisms and that is configured to rotate, arranged to receive and direct the emitted light, and arranged to receive and direct backscattered light. The apparatus further includes a reflecting apparatus with multiple reflective facets and configured to rotate, arranged to reflect the emitted light, and arranged to reflect the backscattered light. A focusing apparatus is arranged to focus the backscattered light from the disk towards the detector.

20 Claims, 24 Drawing Sheets

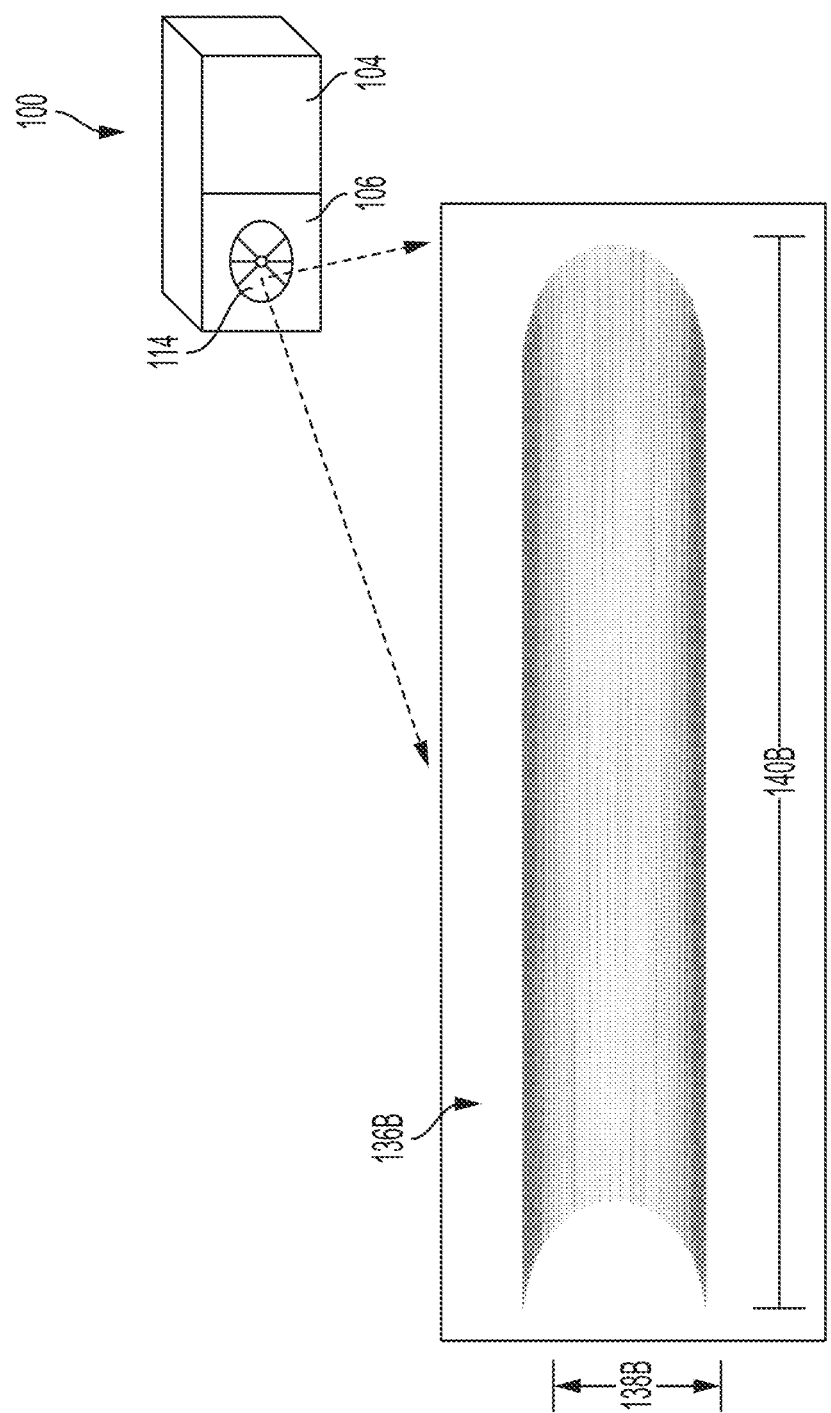

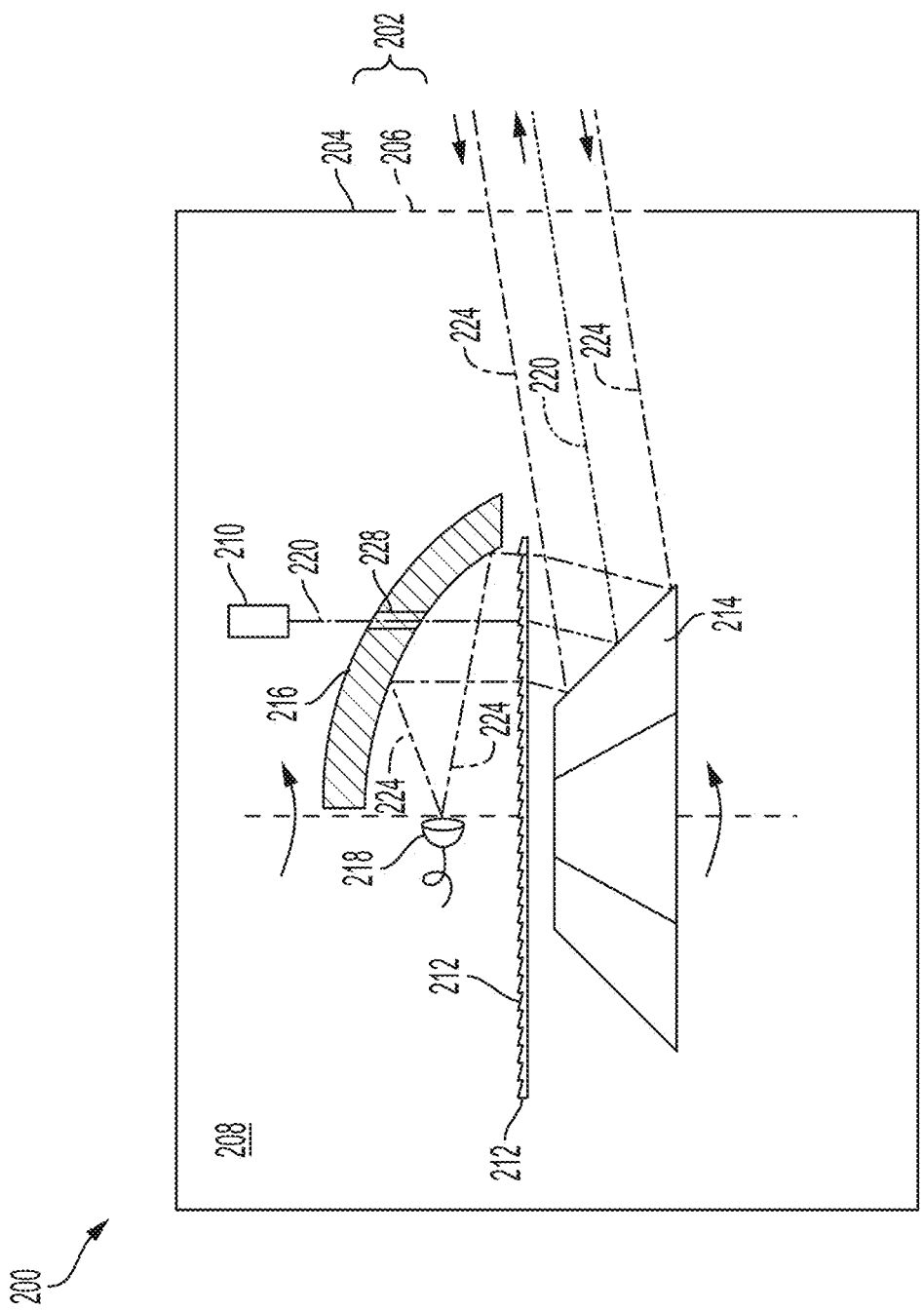

PYRAMIDAL MIRROR LASER SCANNING FOR LIDAR

SUMMARY

In Example 1, an apparatus includes a detector; a light source configured to emit light; a disk having a set of prisms, being configured to rotate, arranged to receive and direct the emitted light, and arranged to receive and direct backscattered light; a reflecting apparatus having multiple reflective facets, being configured to rotate, arranged to reflect the emitted light, and arranged to reflect the backscattered light; and a focusing apparatus arranged to focus the backscattered light from the disk towards the detector.

In Example 2, the apparatus of Example 1, wherein the focusing apparatus is a curved mirror or a lens.

In Example 3, the apparatus of Example 1, wherein the focusing apparatus is a curved mirror, the apparatus further comprising a lens arranged to focus the backscattered light reflected by the curved mirror towards the detector.

In Example 4, the apparatus of any of Examples 1-3, further comprising a flat surface mirror arranged to reflect the backscattered light from the disk towards a lens, wherein the lens is arranged to focus the backscattered light towards the detector.

In Example 5, the apparatus of any of Examples 1-4, wherein the focusing apparatus includes an aperture through which the emitted light passes.

In Example 6, the apparatus of any of Examples 1-5, wherein the detector is a single detector.

In Example 7, the apparatus of any of Examples 1-6, further comprising a reflector arranged to reflect light from the light source towards the plurality of disks.

In Example 8, the apparatus of Example 7, wherein the reflector is a rotatable mirror.

In Example 9, the apparatus of any of Examples 1-8, further comprising a beam splitter configured to split the emitted light from the light into a number of separate light beams, wherein each of the number of beams is directed to different reflective facets of the reflecting apparatus at a given position of the reflecting apparatus.

In Example 10, the apparatus of Example 9, wherein the apparatus comprises a plurality of detectors equal in number to the number of separate light beams created by the beam splitter.

In Example 11, the apparatus of any of Examples 1-5 and 7-10, wherein a number of detectors is equal to a number of light sources.

In Example 12, the apparatus of any of Examples 1-11, wherein a number of reflective facets of the reflecting apparatus is 6-12.

In Example 13, the apparatus of any of Examples 1-12, wherein the disk includes multiple sets of prisms each with prisms having different prism angles from the other sets of prisms.

In Example 14, the apparatus of any of Examples 1-13, further comprising a housing including a base member and a transparent cover that at least partially encompass an internal cavity, wherein the detector, the light source, the disk, and the focusing apparatus are positioned within the internal cavity.

In Example 15, a method for generating a scanning light pattern is disclosed. The method includes rotating a disk having prisms; rotating a reflecting apparatus having multiple reflective facets; directing light from a light source through the rotating disk to create a first light pattern; and reflecting, via the rotating reflecting apparatus, the first light to generate the scanning light pattern.

In Example 16, the method of Example 15, further comprising receiving, at a detector, backscattered light of the generated scanning light pattern that is reflected by the rotating reflecting apparatus and that passes through the disk.

In Example 17, the method of any of Examples 15 and 16, further comprising focusing, with a focusing apparatus, the backscattered light that has been reflected by the rotating reflecting apparatus and that has passed through the disk towards the detector.

In Example 18, an apparatus includes a detector; a light source configured to emit light; a first disk having a first set of prisms, being configured to rotate, arranged to receive and direct the emitted light, and arranged to receive and direct backscattered light; a second disk having a multiple sets of prisms, being configured to rotate, arranged to receive and direct the emitted light, and arranged to receive and direct backscattered light; a stationary reflecting apparatus arranged to reflect the emitted light and arranged to reflect the backscattered light; and a focusing apparatus arranged to focus the backscattered light towards the detector.

In Example 19, the apparatus of Example 18, wherein the stationary mirror is a conical-shaped mirror.

In Example 20, the apparatus of any of Examples 18 and 19, wherein the multiple sets of prisms on the second disk each have the same area of the other sets of prisms.

In Example 21, the apparatus or methods of any of Examples 1-20, wherein the prisms are Fresnel prisms.

BRIEF DESCRIPTION OF THE DRAWINGS

FIGS. 6A and 6B show schematic, perspective views of the measurement device of FIG. 1 and exemplary scanning paths generated by the measurement device, in accordance with certain embodiments of the present disclosure.

FIG. 7 shows a schematic, cut-away view of another measurement device, in accordance with certain embodiments of the present disclosure.

Figure 1:
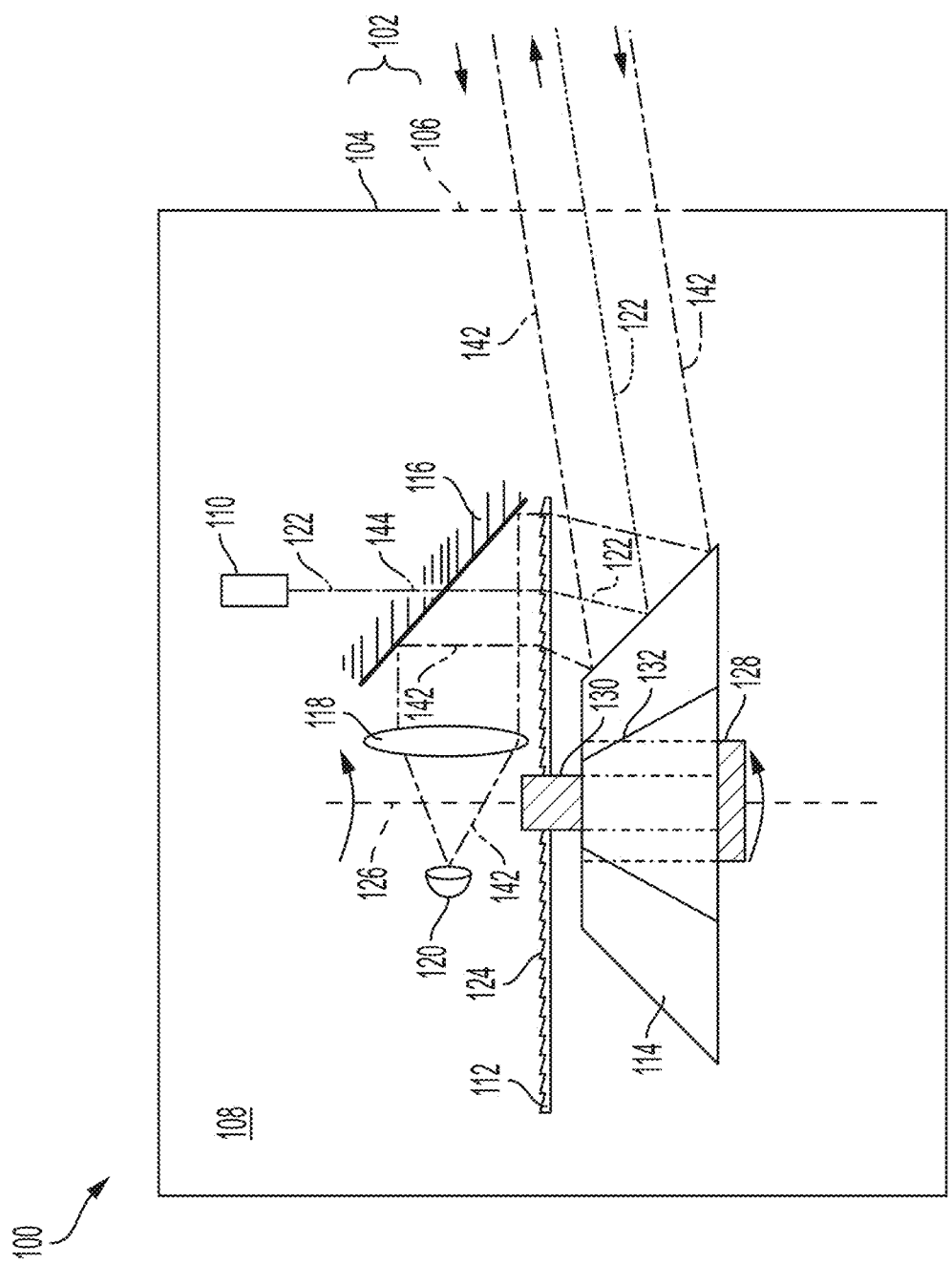
FIG. 1 shows a schematic, cut-away view of a measurement device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Certain embodiments of the present disclosure relate to measurement devices and techniques, particularly, measurement devices and techniques for light detection and ranging, which is commonly referred to as LIDAR, LADAR, etc.

Current LIDAR devices such as those used in time-of-flight-based systems typically use a series of spinning mirrors that steer many narrow light beams. These devices utilize a low numerical aperture, such that only a small amount of reflected light is received by detectors within the device. As a result, these devices require very sensitive detectors. Certain embodiments of the present disclosure are accordingly directed to devices and techniques for measurement systems, such as LIDAR systems, in which sensors with a broader range of sensitivities can be used while still achieving accurate measurements. Further, as will be described in more detail below, the disclosed measurement devices include optical elements and arrangements that can be used to generate scanning patterns of light (e.g., paths along which light is scanned) with a large two-dimensional field of view using as few as one light source and to detect backscattered light using as few as one detector.

FIG. 1 shows a schematic of a measurement device 100 (e.g., a LIDAR/LADAR device) including a housing 102 with a base member 104 and a cover 106. The base member 104 and the cover 106 can be coupled together to surround an internal cavity 108 in which various components of the measurement device 100 are positioned. Various surfaces of components of the housing 102 can be coated with a light-absorbing or anti-reflective coating. In certain embodiments, the base member 104 and the cover 106 are coupled together to create an air-tight seal and/or water-tight seal. For example, various gaskets or other types of sealing members can be used to help create such seals between components of the housing 102. The base member 104 can comprise materials such as plastics and/or metals (e.g., aluminum). The cover 106 can comprise transparent materials such as glass or sapphire. For simplicity, the housing 102 in FIG. 1 is shown with only the base member 104 and the cover 106, but the housing 102 can comprise any number of components (e.g., fasteners, seals) that can be assembled together to surround the internal cavity 108 and/or secure components of the measurement device 100. Further, the base member 104 may be machined, molded, or otherwise shaped to support and/or secure the components of the measurement device 100.

The figures are intended to show examples of how the features of the measurement devices can be arranged to create scanning patterns of light that are emitted from and scattered back to the measurement devices. For example, the figures show how the features of the measurement devices can be physically arranged with respect to each. Further, the figures show example arrangements and orientations of optical elements within optical paths that create patterns of light and collect, redirect, focus, and/or detect light scattered back to the measurement devices. As will be described further below, the arrangements and orientations of optical elements can be modified from the arrangements and orientations in the Figures without departing from the scope of the present disclosure. Further yet, the features of the various measurement devices shown and described below can be combined and/or interchanged with other measurement devices.

The measurement device 100 includes a light source 110 (e.g., a laser; LED), a disk 112 (e.g., a rotatable disk), a first reflecting apparatus 114 (e.g., beam-steering device; a rotatable pyramidal-shaped mirror), a second reflecting apparatus 116 (e.g., a stationary mirror), a focusing apparatus 118 (e.g., a lens; a curved mirror such as a parabolic mirror), and a detector 120 (e.g., a sensor).

The light source 110 can be a laser (e.g., a laser such as a VCSEL and the like) or a light-emitting diode. In certain embodiments, the light emitted is coherent light. In certain embodiments, the light source 110 emits light within the infrared spectrum (e.g., 905 nm or 1550 nm frequencies) while in other embodiments the light source 110 emits light within the visible spectrum (e.g., a 485 nm frequency). In certain embodiments, the light source 110 is configured to emit light in pulses. Non-limiting examples of pulse rates for the light source 110 include 100-1000 kHz, 200-800 kHz, and 300-600 kHz. Although the measurement devices described herein reference are typically described in the context of pulsed, time-of-flight LIDAR approaches, the measurement devices can be used for continuous-wave LIDAR, frequency-modulated LIDAR, amplitude-modulated LIDAR, etc., as well. Further, although only one light source 110 is shown in FIG. 1, multiple light sources, beam splitters, and/or optical switches can be used with the measurement device 100. In embodiments with multiple light sources, the light sources can be pulsed asynchronously to avoid interference or cross-talk at the one or more detectors. In certain embodiments using multiple light beams, the different light beams can be timed to fire within certain angular positions of the disk 112.

Figure 2:
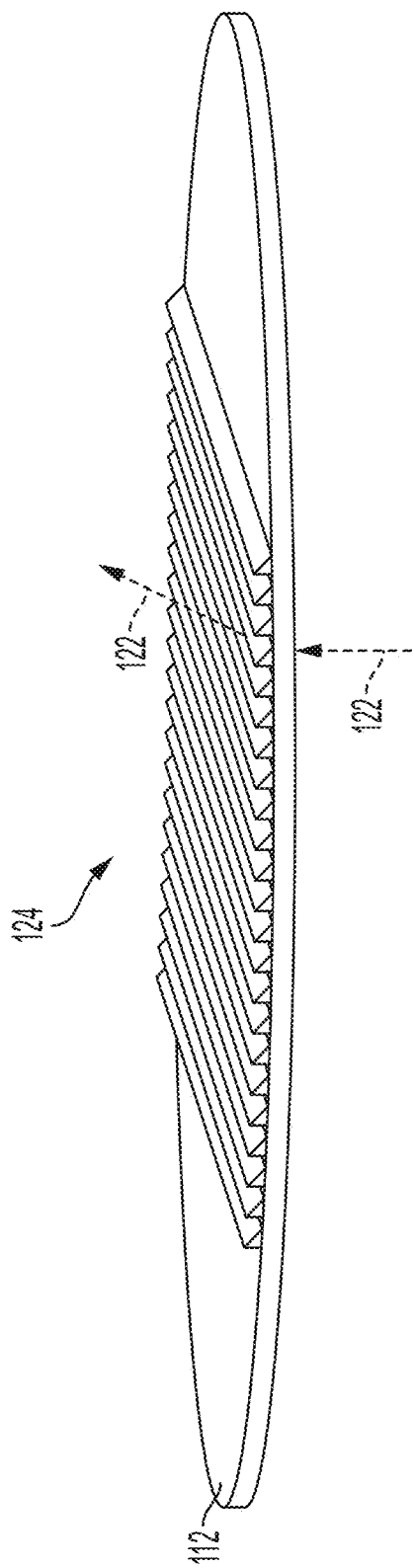
FIG. 2 shows a perspective view of a disk capable of use in measurement devices, in accordance with certain embodiments of the present disclosure.
Figure 3:
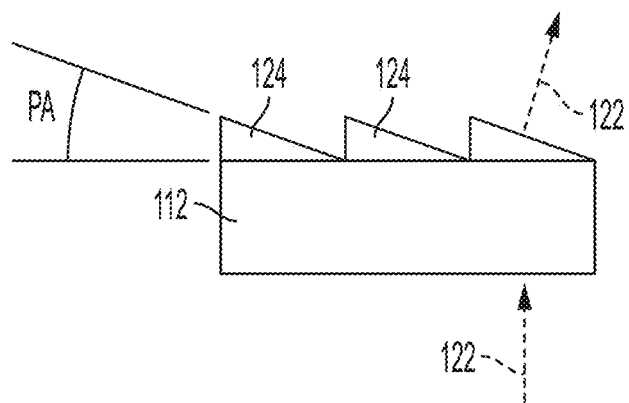
FIG. 3 shows close-up, cut-away views of a portion of a disk capable of use in measurement devices, in accordance with certain embodiments of the present disclosure.

The light emitted by the light source 110 is directed towards the disk 112. The emitted light is represented in FIGS. 1-3 by reference number 122. The disk 112 includes at least one set of prisms 124 (e.g., Fresnel prisms). In certain embodiments, including embodiments describing other measurement devices herein, the disk 112 can be considered to be a disk-shaped Fresnel prism. FIG. 2 shows a perspective view of the disk 112 with an example set of prisms 124, and FIG. 3 shows a close-up side view of the prisms 124. Although FIG. 2 shows the prisms 124 only extending over a portion of one side of the disk 112, the prisms 124 can extend over the entire upper surface (as shown in FIG. 1) and/or the entire lower surface of the disk 112. FIG. 3 shows each of the prisms 124 having the same prism angle (PA). Example prism angles can range from 0.5-30 degrees, 2-15 degrees, 5-15 degrees.

The disk 112 can be comprised of one or more transparent materials such as glass, sapphire, and polymers (e.g., polycarbonate, high-index plastics) and can be coated with an anti-reflective coating. The disk 112 and/or the prisms 124 can be made via molding, three-dimensional printing, etching, machining, and the like. For example, the disk 112 may be comprised of a planar disk substrate with the prisms 124 printed thereon or otherwise attached thereto. The diameter of the disk 112 can vary depending on the application, size of the measurement device 100, and other constraints such as available power or desired power consumption to rotate the disk 112. In certain embodiments, the disk 112 is 60-80 mm in diameter.

The disk 112 is configured to rotate around an axis 126. The measurement device 100 can include a motor 128 (schematically shown in FIG. 1) that rotates the disk 112. For example, the motor 128 can be coupled to a shaft 130 that coupled to the disk 112 at a central portion of the disk 112 (e.g., at a central aperture of the disk 112). In another example, the motor 128 surrounds the disk 112 and is coupled to an outer circumference of the disk 112. The motor 128 can be a fluid-dynamic-bearing motor, a ball-bearing motor, and the like.

Figure 5:
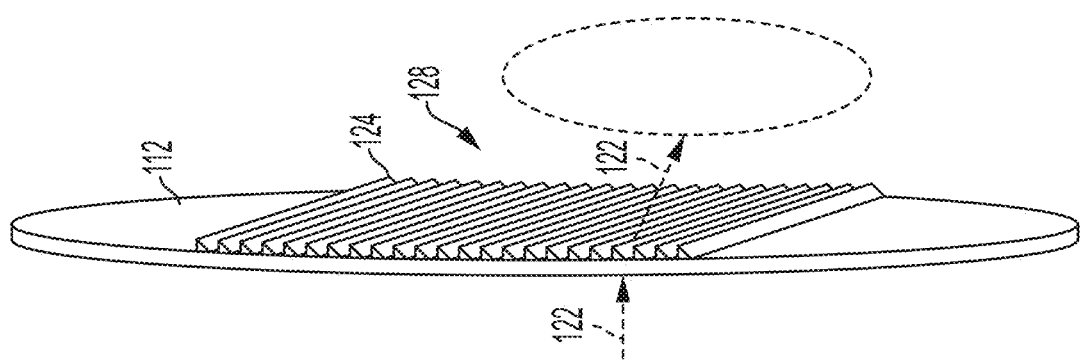
FIG. 5 shows an exemplary schematic of a scanning path generated by the measurement device of FIG. 1, in accordance with certain embodiments of the present disclosure.

As the disk 112 rotates, the emitted light 122 is deflected in a three-dimensional cone pattern resulting in a two-dimensional circle within a plane as shown in FIG. 5. The emitted light 122 deflected by the disk 112 is then directed towards the rotating mirror 114.

Figure 4:
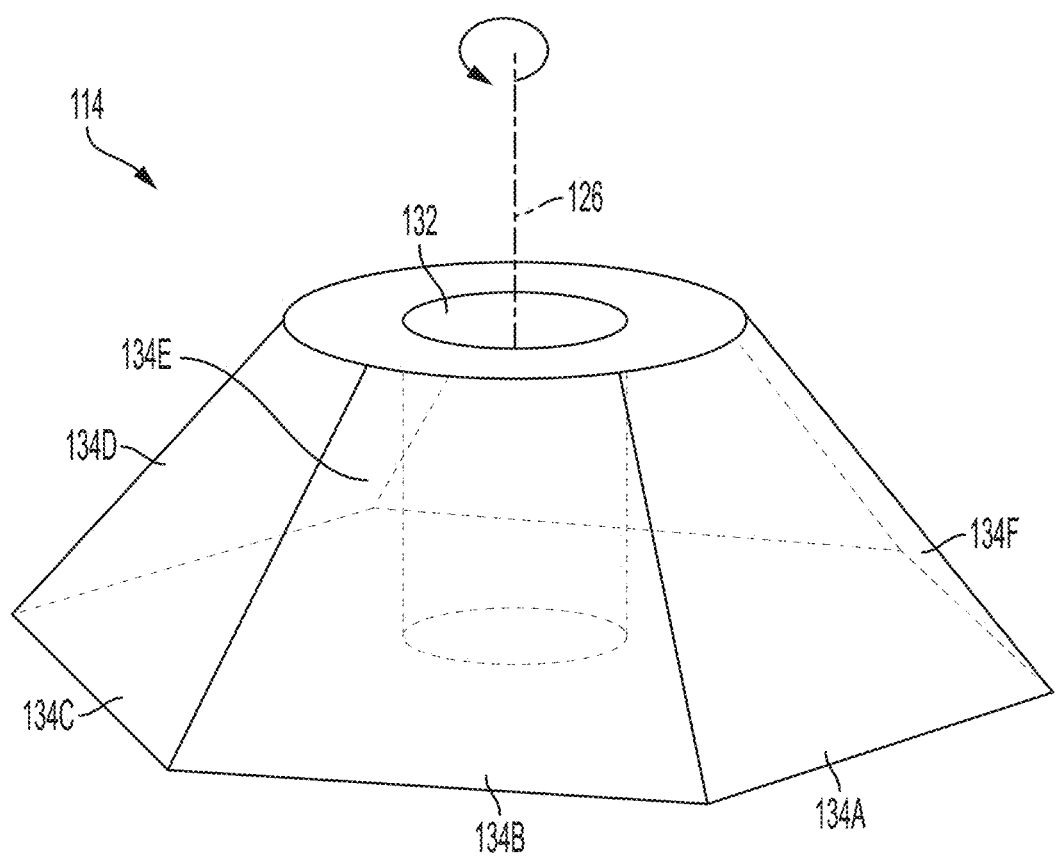
FIG. 4 shows a perspective view of a reflecting apparatus and a motor, in accordance with certain embodiments of the present disclosure.

An exemplary rotating mirror 114 is shown in FIG. 4 can be described as a six-sided (or hexagonal) pyramidal-shaped rotating mirror. The rotating mirror 114 can be at least partially created using three-dimensional printing, molding, machining, and the like. The rotating mirror 114 is coupled to a motor 132 that rotates the rotating mirror 114 during operation of the measurement device 100. In certain embodiments, the motor 132 is directly coupled to a central aperture of the rotating mirror 114. In other embodiments, the motor 132 rotates a shaft that is coupled to the rotating mirror 114.

The motor 132 can be a fluid-dynamic-bearing motor, a ball-bearing motor, and the like. Although the motor 132 is shown as being centrally positioned within the rotating mirror 114, the rotating mirror 114 can be rotated via other means. The rotating mirror 114 and the disk 112 can be rotated independently from each other such that they rotate in the same or different directions and/or the same or different speeds. In certain embodiments, the motor 132 that rotates the rotating mirror 114 and the motor 128 that rotates the disk 112 are coaxial. In such embodiments, one of the motors and shafts may be sized such that it extends through the other motor and/or the other shaft.

Increasing rotational speed of the motor 132 (and therefore the rotational speed of the rotating mirror 114) increases the sampling rate of the measurement device 100 but also increases the power consumed by the measurement device 100. In certain embodiments, the disk 112 is rotated at a lower speed than the rotating mirror 114. Non-limiting examples of rotating speeds for the disk 112 include 50-1000 rpm, 100-800 rpm, and 300-600 rpm for low-speed applications and 60,000-120,000 rpm for high-speed applications. Non-limiting examples of rotating speeds for the rotating mirror 114 include 500-15,000 rpm, 1,000-13,000 rpm, and 5,000-11,000 rpm.

The rotating mirror 114 comprises a plurality of facets/faces 134A-F. Each facet 134A-F includes or otherwise incorporates a reflective surface such as a mirror. For example, a separate mirror can be attached to each facet 134A-F of the rotating mirror 114. Although the rotating mirror 114 is shown and described as having six facets 134A-F at an approximately 45-degree angle, the reflecting apparatus can have fewer or more facets (e.g., 3-5 facets, 6-9 facets, 7-24 facets) at different angles (e.g., 30-60 degrees). Further, one or more facets 134A-F can be at different angles than the other facets 134A-F. For example, facet 134A may be angled at 41 degrees with respect to an axis perpendicular to the axis 126, facet 134B at 42.5 degrees, facet 134C at 44 degrees, facet 134D at 45.5 degrees, facet 134E at 47 degrees, and facet 134F at 48.5 degrees. As another non-limiting example, each facet 134A-F can alternate between angles (e.g., facets 134A, 134C, and 134E angled at 42.5 degrees, and facets 134B, 134D, and 134F angled at 47.5 degrees). The angle of the facets 134A-F affects what portion within the total field of view of the measurement device 100 the emitted light 122 is scanned along. The number of facets affects the displacement of the emitted light 122. For example, as the rotating mirror 114 rotates, the emitted light 122 directed towards the rotating mirror 114 (e.g., the emitted light 122 steered in a circle pattern by the rotating disk 112) will be reflected and scanned horizontally, and the extent of the scan in the horizontal direction as described in more detail immediately below.

Figure 6A:
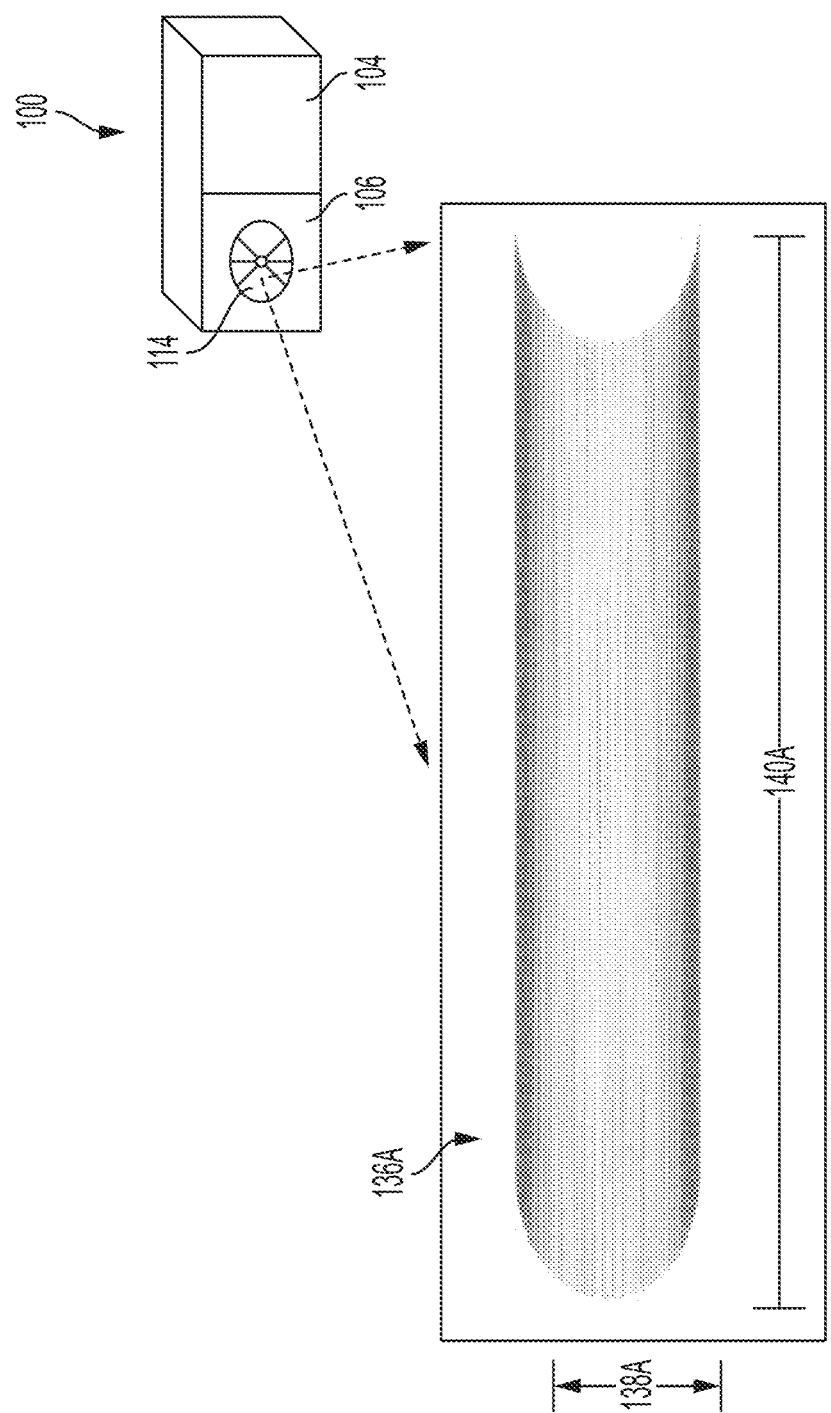

FIGS. 6A and 6B show two example light patterns 136A, 136B created over time when the emitted light 122 from the disk 112 is reflected by the rotating mirror 114. The light pattern 136A shown in FIG. 6A is created over time as the emitted light 122 is scanned along a first half of the circle shown in FIG. 5, and the light pattern 136B shown in FIG. 6B is created over time as the emitted light 122 is scanned along the other half of the circle shown in FIG. 5. The light patterns 136A, 136B have respective vertical components 138A, 138B and respective horizontal components 140A, 140B that make up the field of view of the measurement device 100 in which the emitted light 122 is scanned throughout over time as the measurement device operates. The vertical component 138A, 138B of the light patterns 136A, 136B is dependent, among other things, on the prism angle PA of the prisms 124 on the disk 112. The horizontal component 140A, 140B of the light patterns 136A, 136B is dependent on the number of facets on the rotating mirror 114. For example, when the rotating mirror 114 includes six facets, 134A-F, the emitted light 122 from a single light beam is scanned along a sixty-degree displacement (i.e., 360 degrees divided by the number of facets, which is six for the rotating mirror 114 shown in FIG. 4). This displacement affects the field of view of the measurement device 100. Directing separate light beams to additional facets of the rotating mirror 114 can extend the horizontal component 140A, 140B of the field of view (e.g., directing light to two of the six facets results in a 120-degree displacement). In addition to extending the field of view, using additional light beams can be used to reduce the speed required to rotate the rotating mirror 114 and/or disk 112 for accomplishing a given frame rate of the measurement device 100. As will be described in more detail below, creating additional light beams can be accomplished by adding additional light sources and/or light beams via beam splitters and/or optical switches. Using fewer facets on the rotating mirror 114 can also extend the horizontal component 140A, 140B of the field of view (e.g., five facets results in a 72-degree displacement).

The emitted light 122 is transmitted out of the housing 102 (e.g., through the cover 106) of the measurement device 100 towards objects. A portion of the emitted light reflects off the objects and returns through the cover 106. This light, referred to as backscattered light, is represented in FIG. 1 by reference number 142 (not all of the backscattered light is associated with a reference number in FIG. 1). The backscattered light 142 is reflected by the rotating mirror 114 through the disk 112 and towards the stationary mirror 116. In certain embodiments, the backscattered light 142 is reflected by the same facet on the rotating mirror 114 that the emitted light 122 reflected against before being transmitted out of the housing 102. The backscattered light 142 may be redirected in an optical path that is parallel to the original optical path. As such, the measurement device 100 does not require use of an array of multiple detectors. Instead, as will be discussed in more detail below, the measurement device 100 can use as few as a single detector even when the measurement devices utilize multiple light paths, examples of which are shown in Figures discussed in more detail below.

Figures 23, 24:
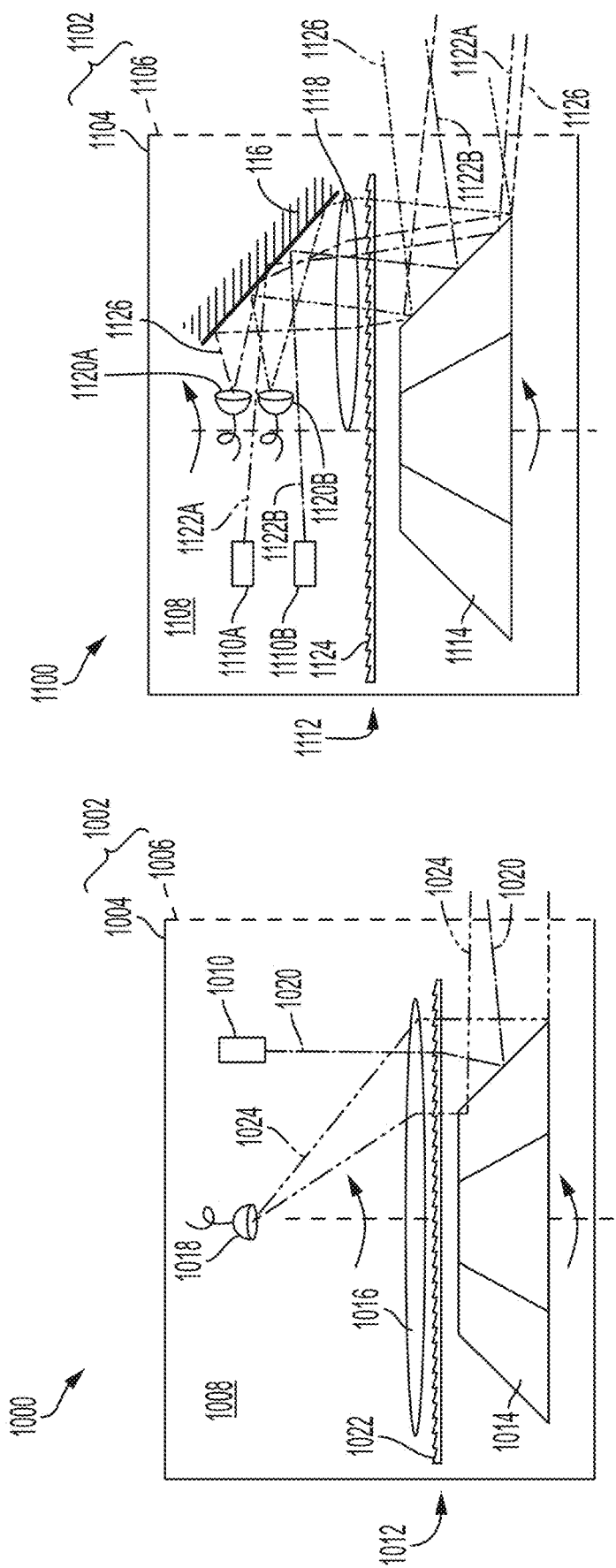
FIG. 23 shows a schematic, cut-away view of another measurement device, in accordance with certain embodiments of the present disclosure.
FIG. 24 shows a measurement device with an alternative arrangement of various optical components, including multiple light sources, that can be incorporated into other measurement devices described herein, in accordance with certain embodiments of the present disclosure.

The stationary mirror 116 can be a front surface mirror that is angled and positioned with respect to the rotatable mirror 114 to reflect the backscattered light 142 towards the focusing apparatus 118. In FIG. 1, the direction of backscattered light 142 is modified by approximately 90 degrees, although other angles can be used depending on the orientation of the focusing apparatus 118 and the detector 120. The stationary mirror 116 can include an aperture 144 to permit the emitted light 122 from the light source 110 to pass through the stationary mirror 116 to the disk 112. Although, in certain embodiments, the stationary mirror 116 can help reduce the overall size of the measurement device 100, in some embodiments, various components of the measurement device 100 are arranged such that the measurement device 100 does not include the stationary mirror 116. One such example is shown in FIG. 24.

The backscattered light 142 reflected by the stationary mirror 116 is focused by the focusing apparatus 118. The focusing apparatus 118 is an optical element that focuses the backscattered light 142 towards the detector 120. For example, the focusing apparatus 118 can be a lens with a focal point positioned at the detector 120. The particular shape, size, position, and orientation of the focusing apparatus 118 and the detector 120 in the measurement device 100 can depend on, among other things, where the path(s) at which backscattered light 142 is directed within the housing 102, and space constraints of the measurement device 100.

In certain embodiments, the focusing apparatus 118 focuses the backscattered light 142 to a single detector 120, such as a single photodetector/sensor (e.g., single-element detector). In other embodiments, multiple detectors are used, for example, to increase the pixel rate of the measurement devices described herein. In response to receiving the focused backscattered light, the detector 120 generates one or more sensing signals, which are ultimately used to detect the distance and/or shapes of objects that reflect the emitted light back towards the measurement device 100 and ultimately to the detector 120.

FIG. 7 shows a measurement device 200 including a housing 202 with a base member 204 and a transparent cover 206 that can be coupled together to surround an internal cavity 208 in which various components of the measurement device 200 are positioned. For simplicity, the housing 202 in FIG. 7 is shown with only the base member 204 and the cover 206, but the housing 202 can comprise any number of components that can be assembled together to create the internal cavity 208 and secure components of the measurement device 200.

The measurement device 200 includes a light source 210 (e.g., a laser; LED), a disk 212 (e.g., a rotatable disk such as the disk shown in FIGS. 1-3), a reflecting apparatus 214 (e.g., a rotatable pyramidal-shaped mirror), a focusing apparatus 216 (e.g., a curved mirror such as a parabolic mirror), and a detector 218. The light source 210, the disk 212, the reflecting apparatus 214, the detector 218, and other components of the measurement device 200 described below can include and/or incorporate materials, features, functions, etc., like similar components shown and described with respect to the measurement device 100. As such, although the description of the components of the measurement device 200 below is abbreviated, the components can include features described in more detail with respect to the measurement device 100.

The light source 210 can be a laser or a light-emitting diode. In certain embodiments, the light source 210 emits light within the infrared spectrum while in other embodiments the light source 210 emits light within the visible spectrum. In certain embodiments, the light source 210 is configured to emit light in pulses. Although only one light source 210 is shown in FIG. 7, multiple light sources can be used with the measurement device 200.

The light emitted by the light source 210 is directed towards the disk 212. The emitted light is represented in FIG. 7 by reference number 220. The disk 212 includes at least one set of prisms 222. The measurement device 200 can include a motor that rotates the disk 212. As the disk 212 rotates, the emitted light 220 is deflected in a cone pattern resulting in a circle. The emitted light 220 deflected by the disk 212 is then directed towards the rotating mirror 214. The rotating mirror 214 is coupled to a motor that rotates the rotating mirror 214 during operation of the measurement device 200.

The rotating mirror 214 comprises a plurality of facets/faces that include or otherwise incorporate a reflective surface such as a mirror. The disk 212 and the rotating mirror 214 can be used to create light patterns such as the light pattern 136A, 136B shown in FIGS. 6A and 6B. The emitted light 220 is transmitted out of the housing 202 of the measurement device 200 towards objects. A portion of the emitted light reflects off the objects and returns through the cover 206. This light, referred to as backscattered light, is represented in FIG. 7 by reference number 224 (not all of the backscattered light is associated with a reference number in FIG. 7). The backscattered light 224 is reflected by the rotating mirror 214 through the disk 212 and towards the focusing apparatus 216.

Figure 8:
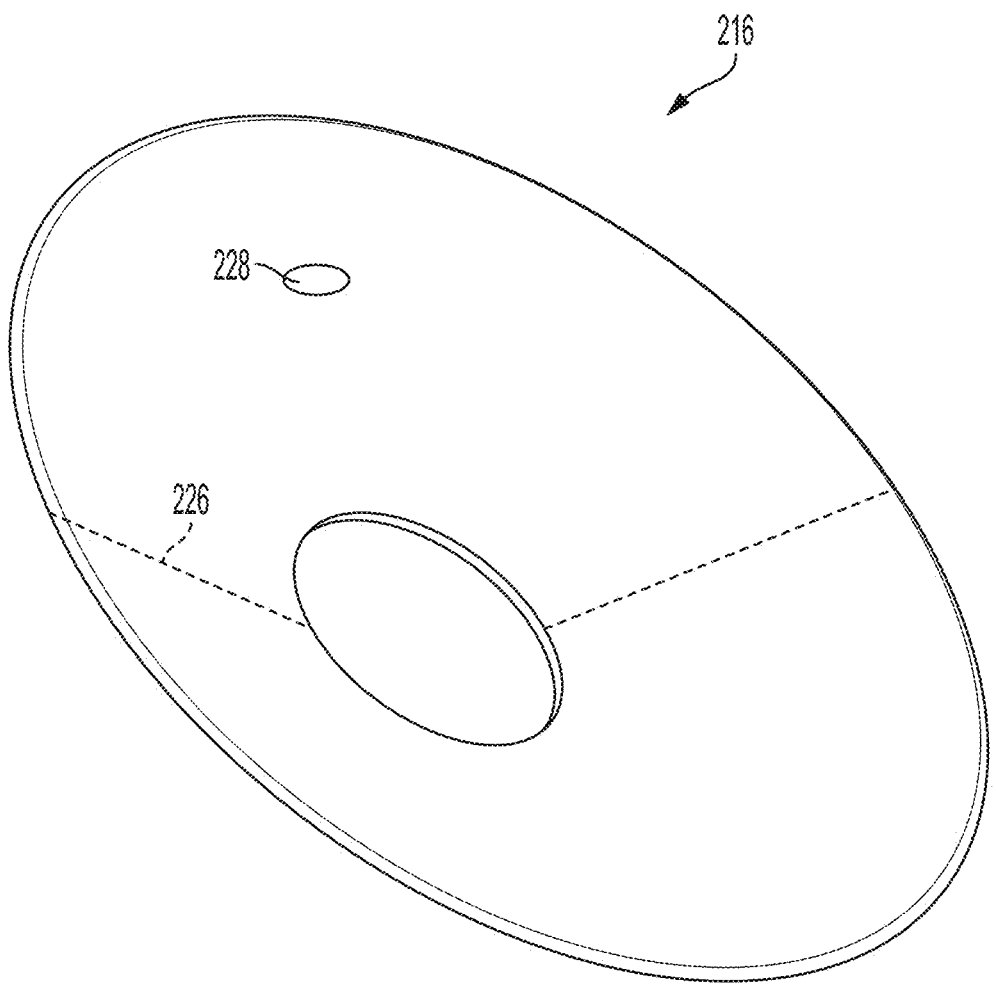
FIG. 8 shows a perspective view of a curved mirror capable of use in measurement devices, in accordance with certain embodiments of the present disclosure.

FIG. 8 shows a perspective view of an exemplary focusing apparatus 216 in the shape of a parabolic mirror. The dotted lines 226 in FIG. 8 show where the parabolic mirror could be cut to create the shape of the focusing apparatus 216 shown in FIG. 7 which is less than the full 360 degrees of the parabolic mirror shown in FIG. 8. The focusing apparatus 216 can include an aperture 228 to permit the emitted light 220 from the light source 210 to pass through the focusing apparatus 216 to the disk 212.

The backscattered light 224 reflected by the rotating mirror 214 is focused by the focusing apparatus 216 towards the detector 218. For example, when the focusing apparatus 216 is a parabolic mirror, the parabolic mirror and the detector 218 can be positioned with respect to each other such that the parabolic mirror's focal point is at the detector 218. The particular shape, size, position, and orientation of the focusing apparatus 216 in the measurement device 200 can depend on, among other things, the position of the detector(s) 218, where the path(s) at which backscattered light 224 is directed within the housing 202, and space constraints of the measurement device 200.

The focusing apparatus 216 can focused backscattered light 224 to one or more detectors 218, such as photodetectors/sensors. In response to receiving the focused backscattered light, the detector 218 generates one or more sensing signals, which are ultimately used to detect the distance and/or shapes of objects that reflect the emitted light back towards the measurement device 200 and ultimately to the detector 218.

Figure 9:
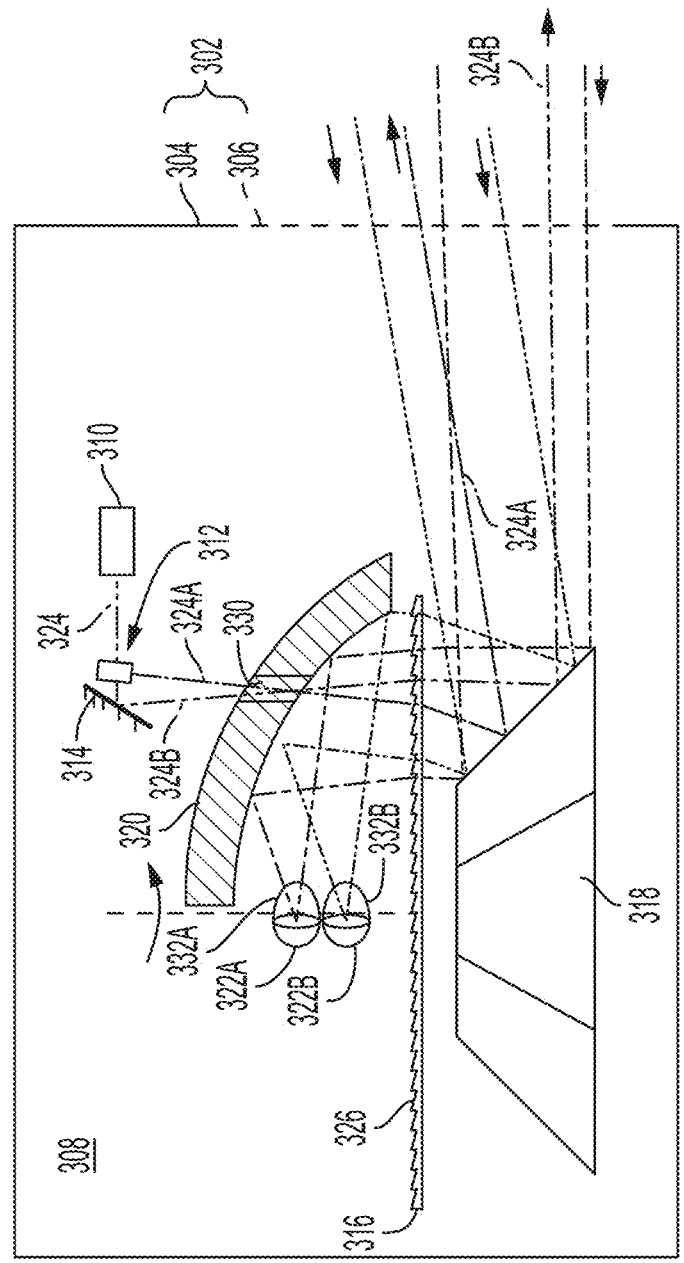
FIG. 9 shows a schematic, cut-away view of another measurement device, in accordance with certain embodiments of the present disclosure.

FIG. 9 shows a measurement device 300 including a housing 302 with a base member 304 and a transparent cover 306 that can be coupled together to surround an internal cavity 308 in which various components of the measurement device 200 are positioned. For simplicity, the housing 302 in FIG. 9 is shown with only the base member 304 and the cover 306, but the housing 302 can comprise any number of components that can be assembled together to create the internal cavity 308 and secure components of the measurement device 300.

The measurement device 300 includes a light source 310 (e.g., a laser; LED), a beam splitter 312, a first reflecting apparatus 314 (e.g., a stationary mirror), a disk 316 (e.g., a rotatable disk such as the disk shown in FIGS. 1-3), a second reflecting apparatus 318 (e.g., a rotatable pyramidal-shaped mirror), a focusing apparatus 320 (e.g., a curved mirror such as a parabolic mirror), a first detector 322A, and a second detector 322B. The light source 310, the first reflecting apparatus 314, the disk 316, the second reflecting apparatus 318, the first detector 322A, the second detector 322B, and other components of the measurement device 300 described below can include and/or incorporate materials, features, functions, etc., like similar components shown and described with respect to the measurement devices 100 and 200. As such, although the description of the components of the measurement device 300 below is abbreviated, the components can include features described in more detail with respect to the measurement devices 100 and 200.

The light source 310 can be a laser or a light-emitting diode. In certain embodiments, the light source 310 emits light within the infrared spectrum while in other embodiments the light source 310 emits light within the visible spectrum. In certain embodiments, the light source 310 is configured to emit light in pulses. Although only one light source 310 is shown in FIG. 9, multiple light sources can be used with the measurement device 300.

Figure 10:
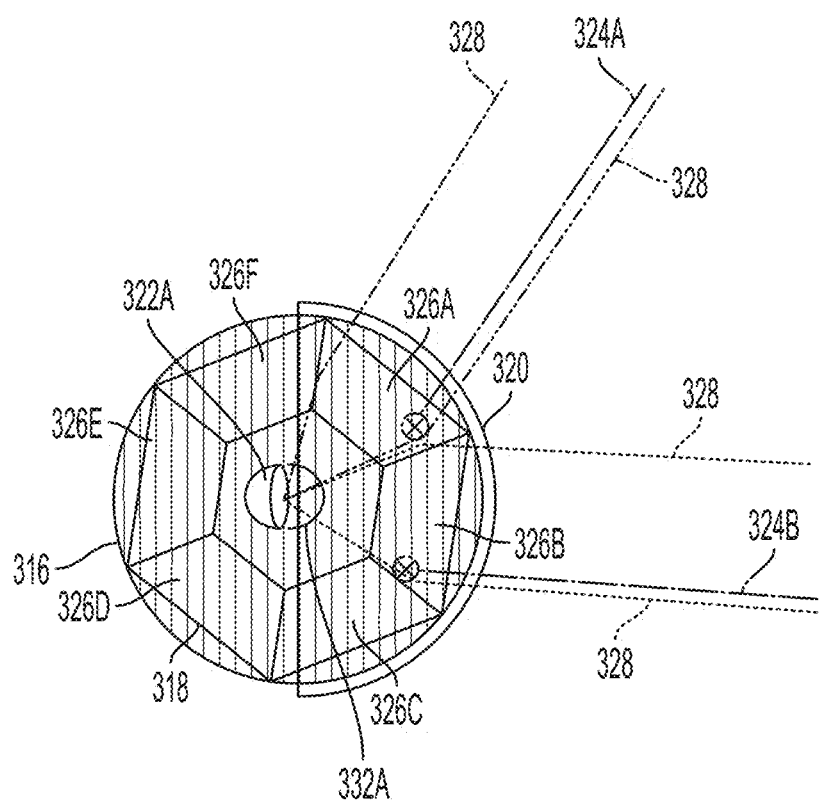
FIG. 10 shows a schematic, top view of portions of the measurement device of FIG. 9, in accordance with certain embodiments of the present disclosure.

The light emitted by the light source 310 is directed towards the beam splitter 312. The emitted light is represented in FIGS. 9 and 10 by reference number 324 for light emitted from the light source 310. The beam splitter 312 separates the emitted light 324 into at least two separate beams, which are represented separately with reference numbers 324A and 324B. In other embodiments, separate beams are created by using multiple light sources. In other embodiments, in place of the beam splitter 312, one or more optical switches can be used. Optical switches can be used to switch between or among different light paths within the measurement device 300.

Each beam 324A, 324B is directed towards different portions (e.g., facets) of the disk 316 via one or more reflecting apparatuses 314 such as front-surface mirrors. The disk 316 includes at least one set of prisms 326. The measurement device 300 can include a motor that rotates the disk 316. As the disk 316 rotates, each light beam 324A, 324B is deflected in a separate cone pattern resulting in a circle. The light beams 324A, 324B deflected by the disk 316 are then directed towards the rotating mirror 318.

The rotating mirror 318 is coupled to a motor that rotates the rotating mirror 318 during operation of the measurement device 300 and comprises a plurality of facets/faces 326A-F that include or otherwise incorporate a reflective surface such as a mirror. FIG. 10 shows each light beam 324A, 324B being directed towards a different facet 326A-F of the rotating mirror 318 at any given point in time. For example, at the point in time shown in FIG. 10, the light beam 324A is directed towards the facet 326A and the light beam 324B is directed towards another facet 326B. Directing emitted light towards multiple facets of the rotating mirror 318 increases the horizontal components of the total field of view of the measurement device. When a separate light beam is directed towards two of the six facets 326A-F of the rotating mirror 318, the horizontal component is 120 degrees. For a 360-degree horizontal field of view, a measurement device could include six separate light beams (via multiple light sources and/or one or more beam splitters) each reflecting off a separate facet of the rotating mirror 318.

The disk 316 and the rotating mirror 318 can be used to create separate light patterns such as the light pattern 136A, 136B shown in FIGS. 6A and 6B. The emitted light 324A, 324B is transmitted out of the housing 302 of the measurement device 300 towards objects. A portion of the emitted light reflects off the objects and returns through the cover 306. This light, referred to as backscattered light, is represented in FIGS. 9 and 10 by reference number 328 (not all of the backscattered light is associated with a reference number in FIGS. 9 and 10). The backscattered light 328 is reflected by the rotating mirror 318 through the disk 316 and towards the focusing apparatus 320. The focusing apparatus 320 can include an aperture 330 to permit the emitted light 324 from the light source 310 to pass through the focusing apparatus 320 to the disk 316.

The backscattered light 328 reflected is focused by the focusing apparatus 320 towards the first detector 322A and the second detector 322B. In certain embodiments, the measurement device 300 includes one or more lenses 332A, 332B (e.g., wide-angle lens) between the focusing apparatus 320 and the detectors 322A and 322B. The lenses 332A, 332B can collect and focus backscattered light 328 from a large angle (e.g., up to 180 degrees) from the focusing apparatus 320. Although only the measurement device 300 shown in FIGS. 9 and 10 is described as incorporating lenses 332A, 332B, other measurement devices described herein can utilize such lenses in connection with a parabolic mirror or another type of focusing apparatus. Further, in other embodiments, the measurement device 300 does not include the lenses 332A and 332B.

In response to receiving the focused backscattered light, the detectors 322A and 322B generate one or more sensing signals, which are ultimately used to detect the distance and/or shapes of objects that reflect the emitted light back towards the measurement device 300 and ultimately to the detectors 322A and 322B. The particular shape, size, position, and orientation of the focusing apparatus 320 in the measurement device 300 can depend on, among other things, the position of the detectors 322A and 322B, where the path(s) at which backscattered light 328 is directed within the housing 302, and space constraints of the measurement device 300.

Figure 11:
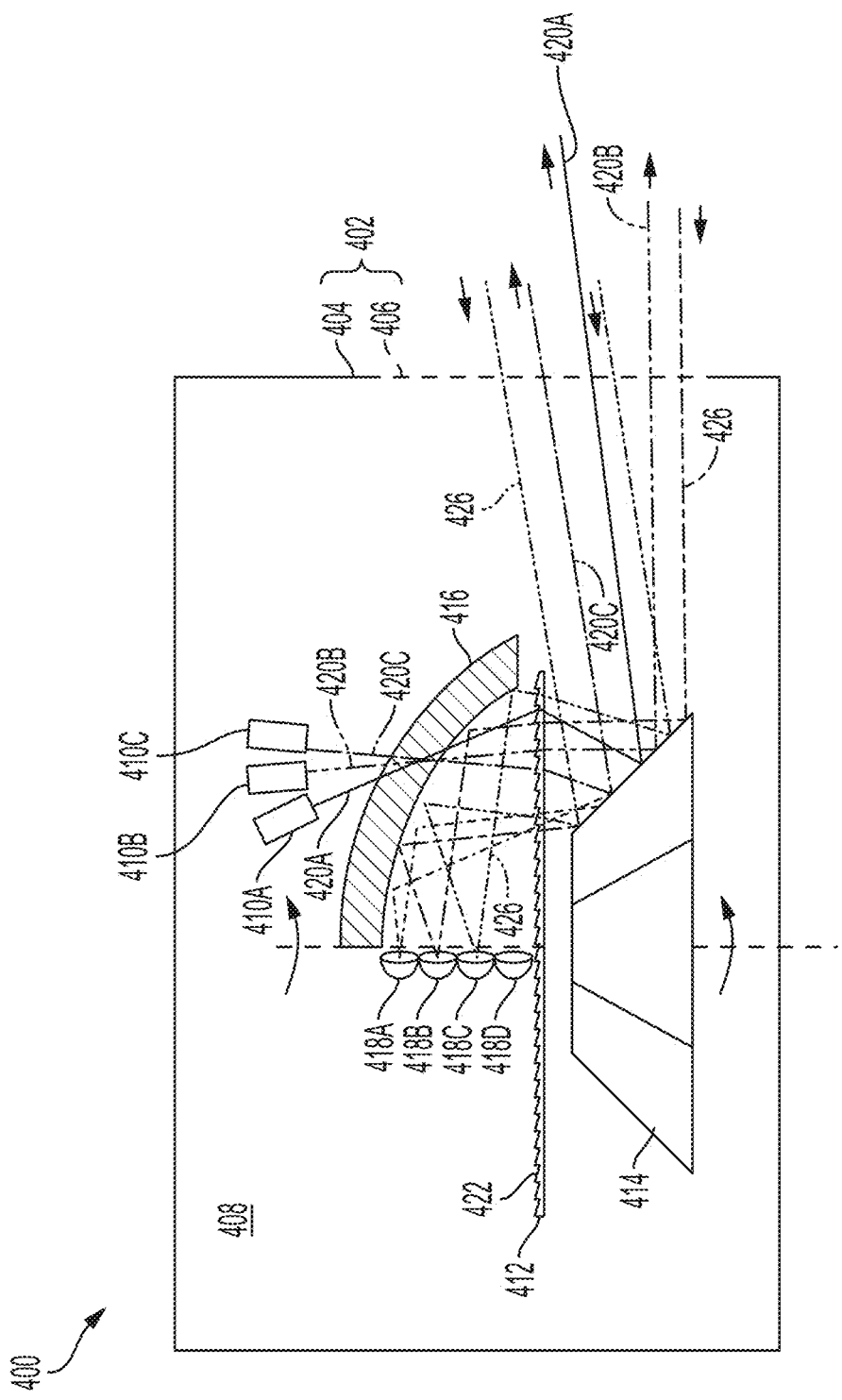
FIG. 11 shows a schematic, cut-away view of another measurement device, in accordance with certain embodiments of the present disclosure.

FIG. 11 shows a measurement device 400 including a housing 402 with a base member 404 and a transparent cover 406 that can be coupled together to surround an internal cavity 408 in which various components of the measurement device 400 are positioned. For simplicity, the housing 402 in FIG. 11 is shown with only the base member 404 and the cover 406, but the housing 402 can comprise any number of components that can be assembled together to create the internal cavity 408 and secure components of the measurement device 400.

The measurement device 400 includes multiple light sources 410A-C (e.g., lasers; LEDs), a disk 412 (e.g., a rotatable disk such as the disk shown in FIGS. 1-3), a reflecting apparatus 414 (e.g., a rotatable pyramidal-shaped mirror), a focusing apparatus 416 (e.g., a curved mirror such as a parabolic mirror), and multiple detectors 418A-C. The light sources 410A-C, the disk 412, the reflecting apparatus 414, the detectors 418A-C, and other components of the measurement device 400 described below can include and/or incorporate materials, features, functions, etc., like similar components shown and described with respect to the measurement devices 100, 200, and 300. As such, although the description of the components of the measurement device 400 below is abbreviated, the components can include features described in more detail with respect to the measurement devices 100, 200, and 300.

Each of the light sources 410A-C can be a laser or a light-emitting diode. Although multiple light sources 410A-C are shown in FIG. 11, as few as one light source (along with one or more beam splitters and/or optical switches) can be used to accomplish similar or equivalent functions. In certain embodiments, the light sources 410A-C emit light within the infrared spectrum while in other embodiments the light sources 410A-C emit light within the visible spectrum. In certain embodiments, the light sources 410A-C are configured to emit light in pulses. In embodiments with multiple light sources, the light sources can fire asynchronous. The asynchronous timing can avoid interference of backscattered light at the detector(s) from different light sources.

The light emitted by the light sources 410A-C is directed towards different portions of the disk 412, which steers the emitted light towards different facets of the rotating mirror 414. The emitted light is represented in FIG. 11 by reference numbers 420A-C. The disk 412 includes at least one set of prisms 422. The measurement device 400 can include a motor that rotates the disk 412. As the disk 412 rotates, each beam 420A-C of the the emitted light is deflected in a separate cone pattern resulting in a separate circle. The emitted light 420A-C deflected by the disk 412 is then directed towards the rotating mirror 414. The rotating mirror 414 is coupled to a motor that rotates the rotating mirror 414 during operation of the measurement device 100.

Figure 12:
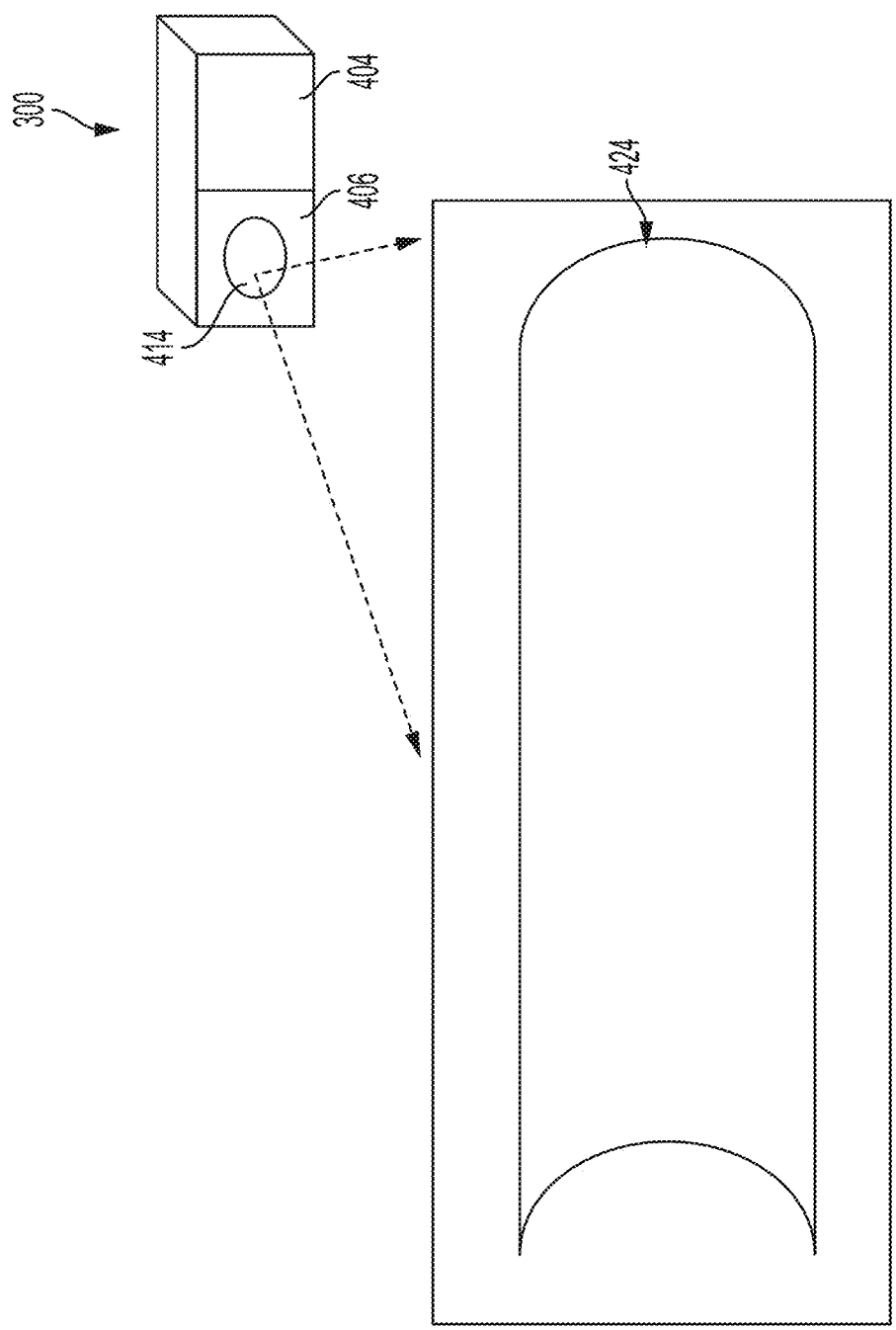
FIG. 12 shows an exemplary schematic of a scanning path generated by the measurement device of FIG. 11, in accordance with certain embodiments of the present disclosure.

The rotating mirror 414 comprises a plurality of facets/faces that include or otherwise incorporate a reflective surface such as a mirror. The disk 412 and the rotating mirror 414 can be used to create light patterns such as the light pattern 136A, 136B shown in FIGS. 6A and 6B. When the light patterns generated from each of the light sources 410A-C are combined, the measurement device's 400 total field of view 424 is approximately the shape shown in FIG. 12 with a horizontal component larger than if only a single light path were used.

The emitted light 420 is transmitted out of the housing 402 of the measurement device 400 towards objects. A portion of the emitted light reflects off the objects and returns through the cover 406. This light, referred to as backscattered light, is represented in FIG. 11 by multiple arrows 426 (not all of the backscattered light is associated with a reference number in FIG. 11). The backscattered light 426 is reflected by the rotating mirror 414 through the disk 412 and towards the focusing apparatus 416.

The reflected backscattered light 426 is focused by the focusing apparatus 416 towards the detectors 418A-C. For example, when the focusing apparatus 416 is a parabolic mirror, the parabolic mirror and the detectors 418A-C can be positioned with respect to each other such that the parabolic mirror's focal point is at the detectors 418A-C. The particular shape, size, position, and orientation of the focusing apparatus 416 in the measurement device 400 can depend on, among other things, the position of the detector(s) 418A-C, where the path(s) at which backscattered light 426 is directed within the housing 402, and space constraints of the measurement device 400. In response to receiving the focused backscattered light, the detectors 418A-C generate one or more sensing signals, which are ultimately used to detect the distance and/or shapes of objects that reflect the emitted light back towards the measurement device 400 and ultimately to the detectors 418A-C.

Figure 13:
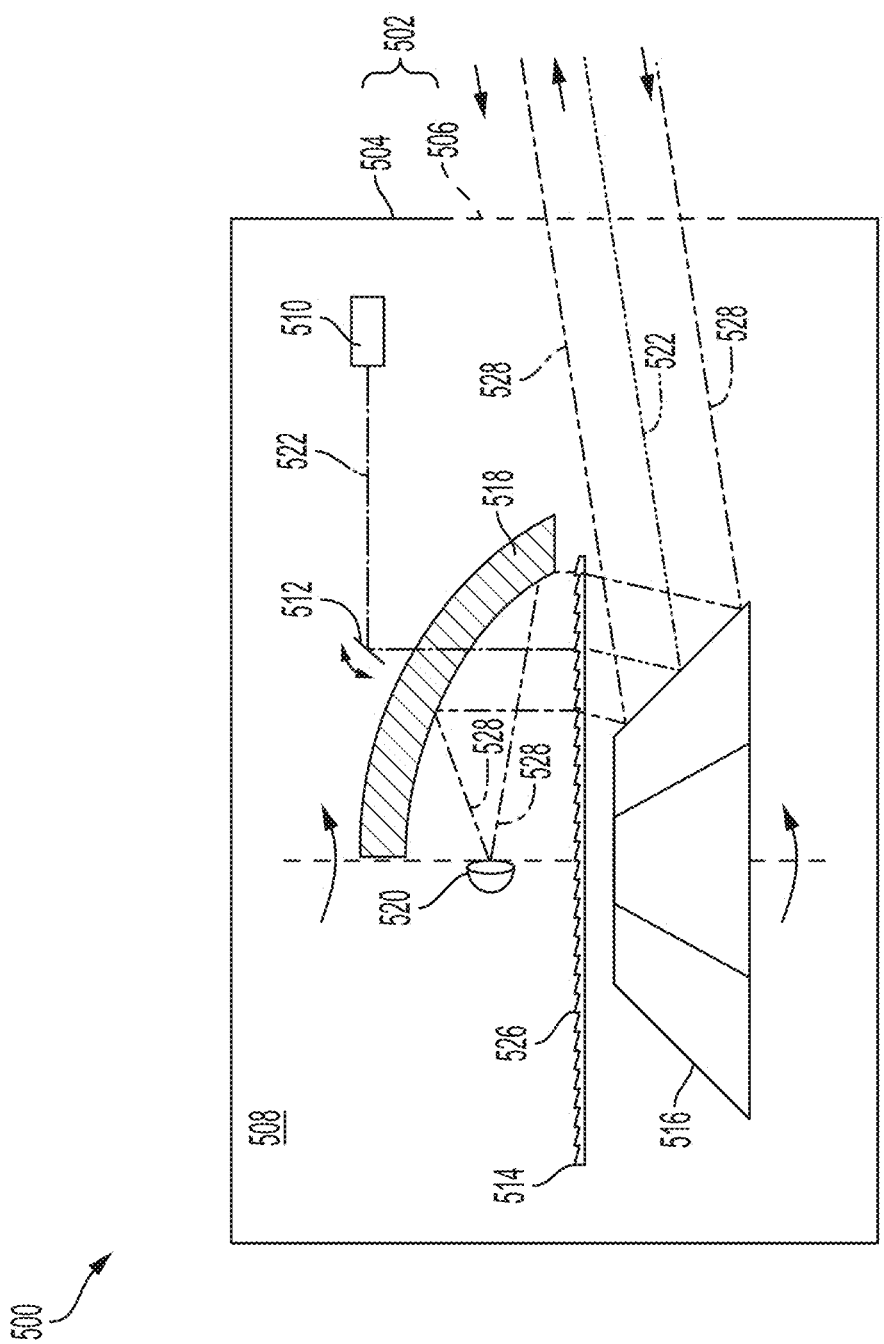
FIG. 13 shows a schematic, cut-away view of another measurement device, in accordance with certain embodiments of the present disclosure.

FIG. 13 shows a measurement device 500 including a housing 502 with a base member 504 and a transparent cover 506 that can be coupled together to surround an internal cavity 508 in which various components of the measurement device 500 are positioned. For simplicity, the housing 502 in FIG. 13 is shown with only the base member 504 and the cover 506, but the housing 502 can comprise any number of components that can be assembled together to create the internal cavity 508 and secure components of the measurement device 500.

The measurement device 500 includes a light source 510, a beam steering device 512 (e.g., a rotating mirror such as a micro electro mechanical systems (MEMS)-based mirror or electro-optical devices such as a potassium tantalate niobite crystal or lithium niobite crystal), a disk 514 (e.g., a rotatable disk such as the disk shown in FIGS. 1-3), a reflecting apparatus 516 (e.g., a rotatable pyramidal-shaped mirror), a focusing apparatus 518 (e.g., a curved mirror such as a parabolic mirror), and a detector 520. The light source 510, the disk 514, the reflecting apparatus 516, the focusing apparatus 518, the detector 520, and other components of the measurement device 500 described below can include and/or incorporate materials, features, functions, etc., like similar components shown and described with respect to the measurement devices 100, 200, 300, and 400. As such, although the description of the components of the measurement device 500 below is abbreviated, the components can include features described in more detail with respect to the measurement devices 100, 200, 300, and 400.

The light source 510 can be a laser or a light-emitting. In certain embodiments, the light source 510 emits light within the infrared spectrum while in other embodiments the light source 510 emits light within the visible spectrum. In certain embodiments, the light source 510 is configured to emit light in pulses. Although only one light source 510 is shown in FIG. 13, multiple light sources can be used with the measurement device 500. The emitted light is represented in FIG. 13 by reference number 522.

Figure 14:
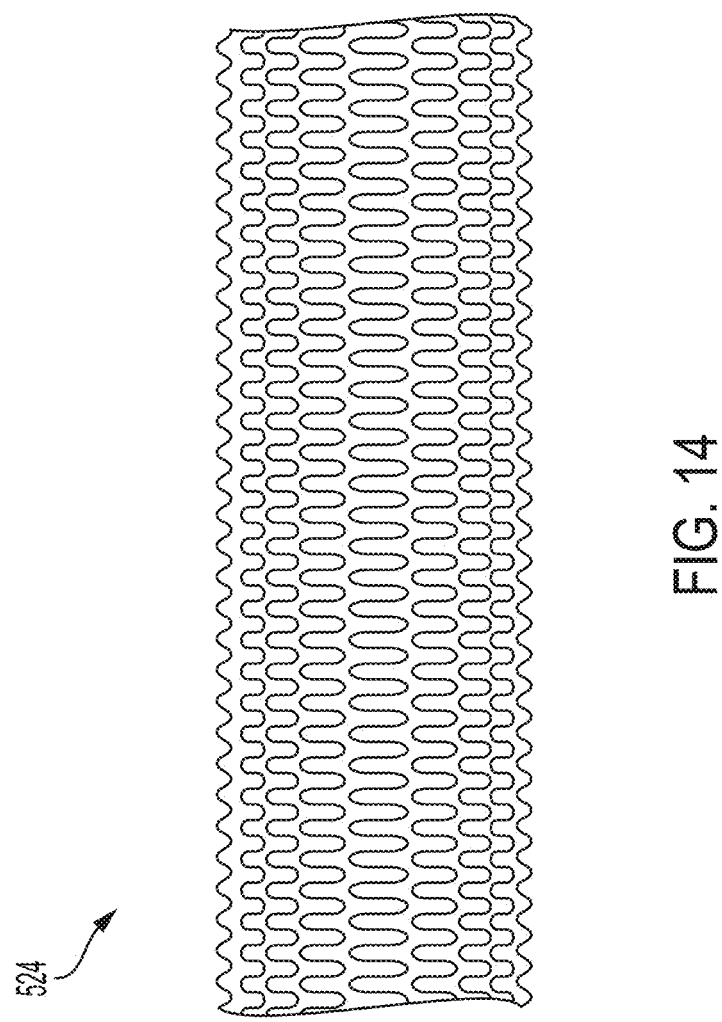
FIG. 14 shows an exemplary schematic of a scanning path generated by the measurement device of FIG. 13, in accordance with certain embodiments of the present disclosure.

The emitted light 522 is directed towards the beam steering device 512. One example of a beam steering device is a MEMS-based mirror, which can be silicon-based and is sometimes referred to as a mirror-on-a-chip. The beam steering device 512 can rotate around an axis such that the emitted light is scanned back and forth along a line. Put another way, the beam steering device 512 can be used to steer the emitted light 522 along a line and towards the disk 514. This line, when reflected by the rotating mirror 516, generates a scan pattern with scan lines shaped like the scan lines 524 shown in FIG. 14. In certain embodiments, the scan lines 524 can be shaped to have substantially the same amplitude such that the scan lines 524 are similarly shaped. In other embodiments, the amplitude of the scan lines 524 is modulated such that the peaks and valleys of the scan lines 524 are different from line to line and/or along a respective scan line.

As shown in FIG. 13, the beam steering device 512 is angled at a nominal angle of 45 degrees with respect to the emitted light 522 from the light source 510 such that the emitted light 522 is reflected at a nominal angle of 90 degrees, although other angles can be used. In certain embodiments, the beam steering device 512 is configured to rotate around the axis within ranges such as 0.10-1 degrees, 0.2-0.5 degrees, and 0.29-0.31 degrees, which are small enough to permit as few as one detector to be used. Using a 0.30-degree range of rotation as an example, the emitted light 522 would be reflected back and forth between angles of 89.7 degrees and 90.3 degrees as the beam steering device 512 rotates back and forth within its range of rotation.

The light emitted by the light source 522 and reflected by the beam steering device 512 is directed towards the disk 514. The disk 514 includes at least one set of prisms 526. The measurement device 500 can include a motor that rotates the disk 514. As the disk 514 rotates, the emitted light 522 is deflected in a cone pattern resulting in a circle. Because of the use of the beam steering device 512, the circle has a "rougher" circumference (e.g., the scan lines tracing the circumference of the circle are shaped like the scan lines 524 shown in FIG. 14). The emitted light 522 deflected by the disk 514 is then directed towards the rotating mirror 516. The rotating mirror 516 is coupled to a motor that rotates the rotating mirror 516 during operation of the measurement device 500.

The rotating mirror 516 comprises a plurality of facets/faces that include or otherwise incorporate a reflective surface such as a mirror. The disk 514 and the rotating mirror 516 can be used to create light patterns such as the light pattern 136A, 136B shown in FIGS. 6 and 7 where the individual scan lines are shaped like those in FIG. 14. The emitted light 522 is transmitted out of the housing 502 of the measurement device 500 towards objects. A portion of the emitted light reflects off the objects and returns through the cover 506. This light, referred to as backscattered light, is represented in FIG. 13 by reference number 528 (not all of the backscattered light is associated with a reference number in FIG. 13). The backscattered light 528 is reflected by the rotating mirror 516 through the disk 514 and towards the focusing apparatus 518.

The reflected backscattered light 528 is focused by the focusing apparatus 518 towards the detector 520. For example, when the focusing apparatus 518 is a parabolic mirror, the parabolic mirror and the detector 520 can be positioned with respect to each other such that the mirror's focal point is at the detector 520. The particular shape, size, position, and orientation of the focusing apparatus 518 in the measurement device 500 can depend on, among other things, the position of the detector(s) 520, where the path(s) at which backscattered light 528 is directed within the housing 502, and space constraints of the measurement device 500.

The focusing apparatus 518 can focus the backscattered light 528 to one or more detectors 520, such as photodetectors/sensors. In response to receiving the focused backscattered light, the detector 520 generates one or more sensing signals, which are ultimately used to detect the distance and/or shapes of objects that reflect the emitted light back towards the measurement device 500 and ultimately to the detector 520.

Figure 15:
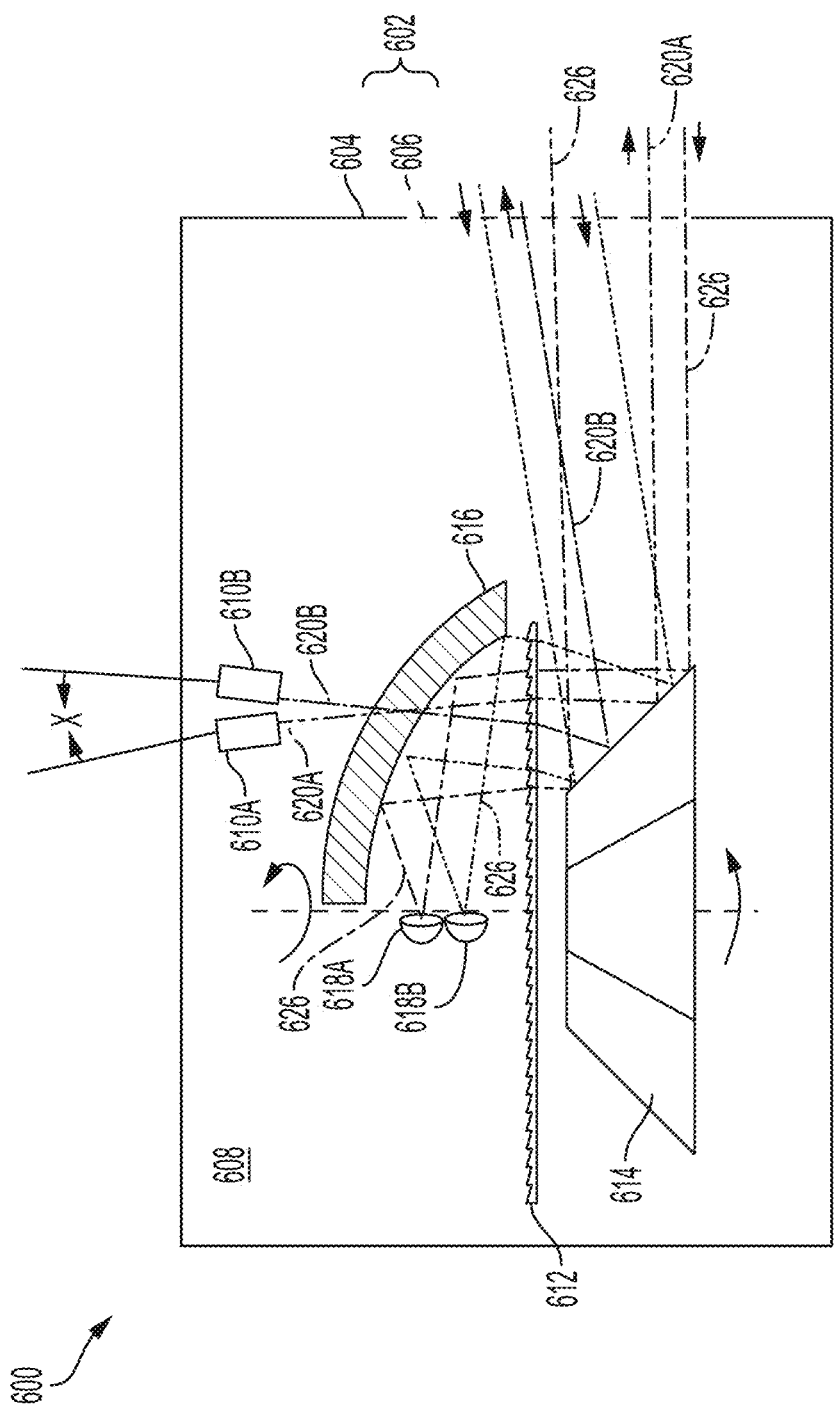
FIG. 15 shows a schematic, cut-away view of another measurement device, in accordance with certain embodiments of the present disclosure.
Figure 16:
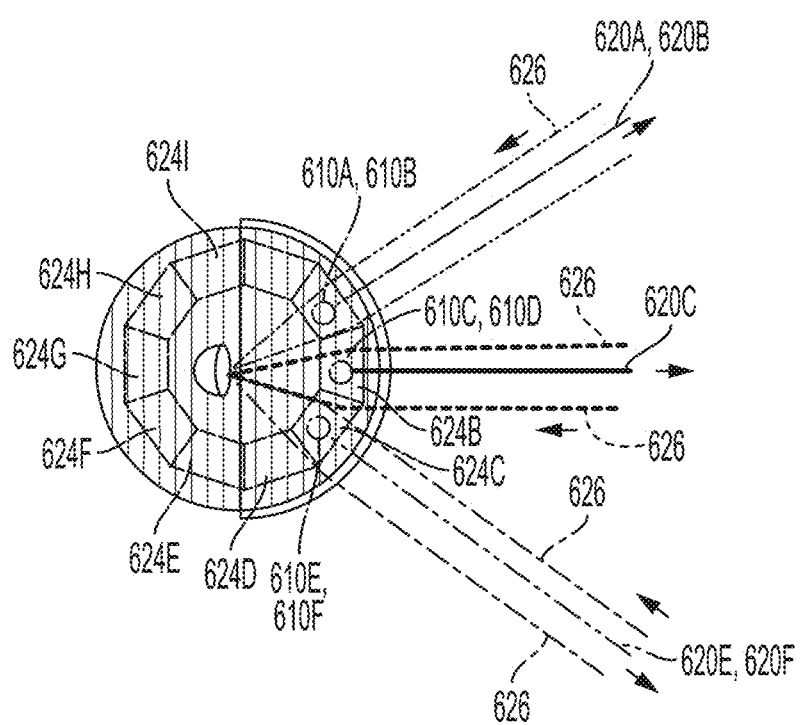
FIG. 16 shows a schematic, top view of portions of the measurement device of FIG. 15, in accordance with certain embodiments of the present disclosure.

FIG. 15 shows a measurement device 600 including a housing 602 with a base member 604 and a transparent cover 606 that can be coupled together to surround an internal cavity 608 in which various components of the measurement device 600 are positioned. For simplicity, the housing 602 in FIG. 15 is shown with only the base member 604 and the cover 606, but the housing 602 can comprise any number of components that can be assembled together to create the internal cavity 608 and secure components of the measurement device 600. FIG. 16 shows a top view of certain components of the measurement device 600.

The measurement device 600 includes multiple light sources 610A-F (e.g., lasers; LEDs), a disk 612 (e.g., a rotatable disk such as the disk shown in FIGS. 1-3), a reflecting apparatus 614 (e.g., a rotatable pyramidal-shaped mirror), a focusing apparatus 616 (e.g., a curved mirror such as a parabolic mirror), and multiple detectors 618A and 618B. The light sources 610A-F, the disk 612, the reflecting apparatus 614, the detectors 618A and 618B, and other components of the measurement device 600 described below can include and/or incorporate materials, features, functions, etc., like similar components shown and described with respect to the measurement devices 100, 200, 300, 400, and 500. As such, although the description of the components of the measurement device 600 below is abbreviated, the components can include features described in more detail with respect to the measurement devices 100, 200, 300, 400, and 500.

The light sources 610A-F can be lasers or light-emitting diodes. Although multiple light sources 610A-F are shown in FIG. 15, as few as one light source (along with one or more beam splitters and/or optical switches) can be used to accomplish similar or equivalent functions. In certain embodiments, the light sources 610A-F emit light within the infrared spectrum while in other embodiments the light sources 610A-F emit light within the visible spectrum. In certain embodiments, the light sources 610A-F are configured to emit light in pulses. The emitted light is represented in FIGS. 15 and 16 by reference numbers 620A-F of which only 620A and 620B are shown in FIG. 15.

FIG. 15 shows two of the light sources 610A and 610B arranged such the light emitted 620A, 620B by the respective light sources 610A and 610B are offset. The offset is represented in FIG. 15 by an "X" and shown as being approximately a 10-degree offset, although other offsets (e.g., 5-15 degrees, 5-25 degrees) can be used depending on the desired total field of view, prism angles, etc. FIG. 16 shows the light sources 610A and 610B arranged to direct emitted light 620A, 620B towards the same facet (at a given point in time) of the rotating mirror 614. The other pairs of light sources (i.e., 610C and 610D; 610E and 610F) are also offset from each other, and each pair is arranged such that emitted light 620C-F is directed towards respective facets of the rotating mirror 614 at a given point in time.

The light emitted 620A-F by the light sources 610A-F is directed towards the disk 612. The disk 612 includes at least one set of prisms 622. The measurement device 600 can include a motor that rotates the disk 612. As the disk 612 rotates, the emitted light 620A-F is deflected in separate cone patterns resulting in separate circles. The emitted light 620A-F deflected by the disk 612 is then directed towards the rotating mirror 614. The rotating mirror 614 is coupled to a motor that rotates the rotating mirror 614 during operation of the measurement device 600.

The rotating mirror 614 comprises a plurality of facets/faces 624A-I that include or otherwise incorporate a reflective surface such as a mirror. In FIG. 16, the rotating mirror is shown as including nine facets 624A-I. The disk 612 and the rotating mirror 614 can be used to create light patterns such as the light pattern 136A, 136B shown in FIGS. 6 and 7. The emitted light 620A-F is transmitted out of the housing 602 of the measurement device 600 towards objects. A portion of the emitted light reflects off the objects and returns through the cover 606. This light, referred to as backscattered light, is represented in FIGS. 15 and 16 by reference number 626 (not all of the backscattered light is associated with a reference number in FIGS. 15 and 16). The backscattered light 626 is reflected by the rotating mirror 614 through the disk 612 and towards the focusing apparatus 616.

The backscattered light 626 reflected is focused by the focusing apparatus 616 towards the detectors 618A and 618B. For example, when the focusing apparatus 616 is a parabolic mirror, the parabolic mirror and the detectors 618A and 618B can be positioned with respect to each other such that the parabolic mirror's focal point is at the detectors 618A and 618B. The particular shape, size, position, and orientation of the focusing apparatus 616 in the measurement device 600 can depend on, among other things, the position of the detectors 618A and 618B, where the path(s) at which backscattered light 626 is directed within the housing 602, and space constraints of the measurement device 600. In response to receiving the focused backscattered light, the detectors 618A and 618B generate one or more sensing signals, which are ultimately used to detect the distance and/or shapes of objects that reflect the emitted light back towards the measurement device 600 and ultimately to the detectors 618A and 618B.

Figure 17:
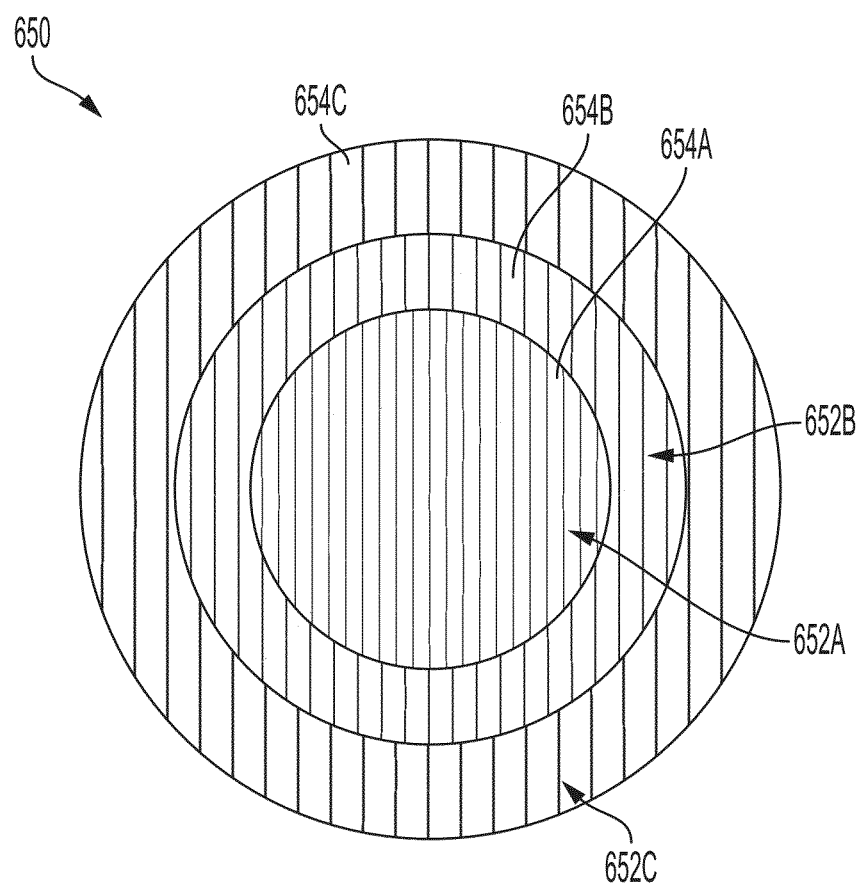
FIG. 17 shows a top view of a disk that can be used in the various measurement devices, in accordance with certain embodiments of the present disclosure.

FIG. 17 shows a top view of a disk 650 that could be used in the measurement devices 100, 200, 300, 400, 500, and 600 described above in place of the disks described above. The disk 650 includes a plurality of sets 652A-C of respective prisms 654A-C. Each set 652A-C includes prisms 654A-C with prism angles that are different from the prism angles of prisms 654A-C in the other sets 652A-C. As such, the disk 650 can be designed to have a different resolution at particular portions of the total field of view. For example, the prisms 654A in the inner set 652A can have the highest prism angle (e.g., 8-10 degrees), the prisms 654B in the middle set 652B can have a lower prism angle than those in the inner set 652A (e.g., 5-8 degrees), and the prisms 654C in the outer set 652C can have the lowest prism angle (e.g., 1-5 degrees) than those in the other sets 652A and 652B. Light passing through lower prism angles will be steered along a smaller diameter circle compared to the angular resolution of higher prism angles in a given amount of time. As such, if the laser fire rate through each set of prisms is held constant, the lower prism angles will have a higher angular resolution compared to higher prism angles. Using the above-described sets, the inner set 652A of prisms 654A with the highest prism angle may be most useful for detecting nearby objects, the middle set 652B of prisms 654B with the lower prism angle may be most useful for detecting between nearby objects and faraway objects, while the outer set 652C of prisms 654C with the lowest prism angle may be most useful for detecting faraway objects.

In measurement devices using a disk sectioned with prisms with different prism angles (e.g., the disk 650), the measurement devices can include a number of lights beams/paths (either generated via multiple light sources or with one or more beam splitters) and a number of detectors equal or greater to the number of different prism sections on the disk. Each different section of the disk would be associated with at least one light beam/path.

Figure 18:
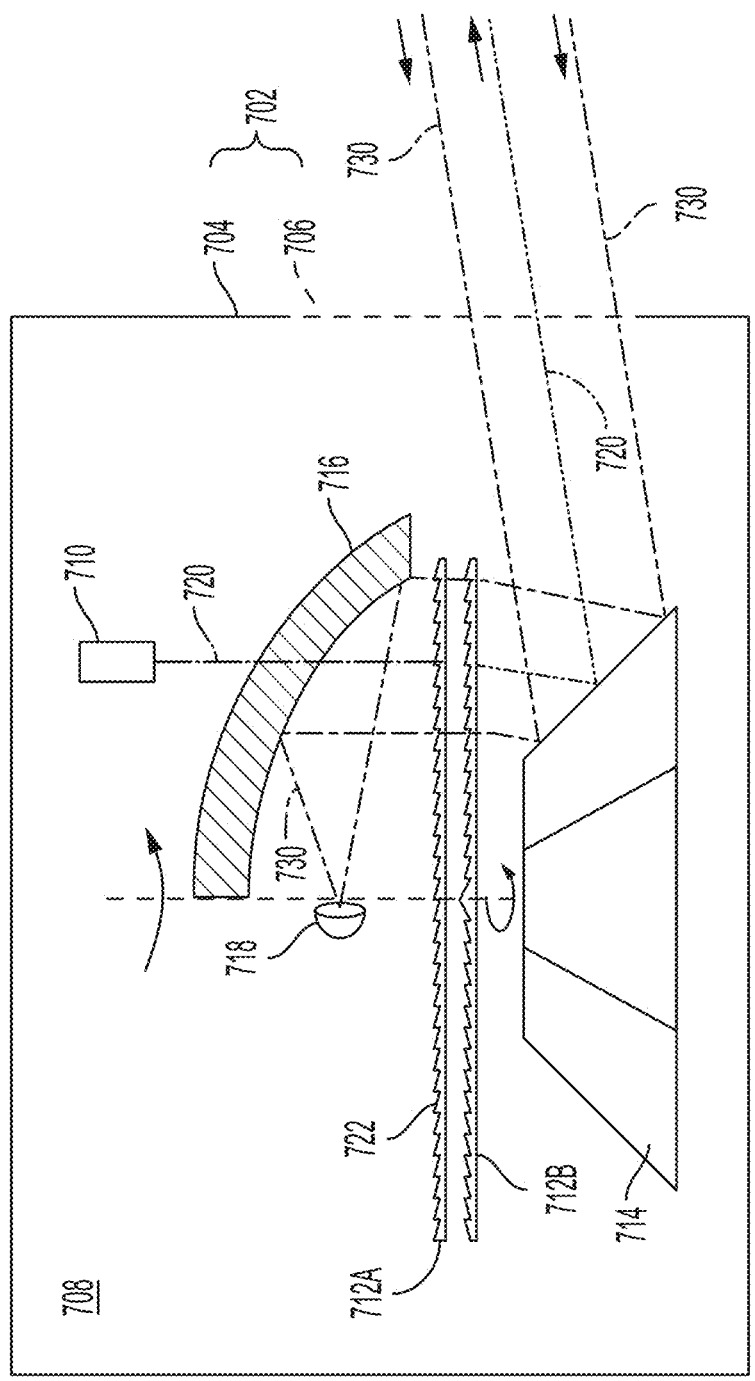
FIG. 18 shows a schematic, cut-away view of another measurement device, in accordance with certain embodiments of the present disclosure.

FIG. 18 shows a measurement device 700 including a housing 702 with a base member 704 and a transparent cover 706 that can be coupled together to surround an internal cavity 708 in which various components of the measurement device 700 are positioned. For simplicity, the housing 702 in FIG. 18 is shown with only the base member 704 and the cover 706, but the housing 702 can comprise any number of components that can be assembled together to create the internal cavity 708 and secure components of the measurement device 700.

The measurement device 700 includes a light source 710, a first disk 712A (e.g., a rotatable disk such as the disk shown in FIGS. 1-3), a second disk 712B (e.g., a rotatable disk such as the disk shown in FIG. 19), a reflecting apparatus 714 (e.g., a stationary conical-shaped mirror), a focusing apparatus 716 (e.g., a curved mirror such as a parabolic mirror), and a detector 718. The light source 710, the first disk 712A, the reflecting apparatus 714, the detector 718, and other components of the measurement device 700 described below can include and/or incorporate materials, features, functions, etc., like similar components shown and described with respect to the measurement devices 100, 200, 300, 400, 500, and 600. As such, although the description of the components of the measurement device 700 below is abbreviated, the components can include features described in more detail with respect to the measurement devices 100, 200, 300, 400, 500, and 600.

The light source 710 can be a laser or a light-emitting diode. In certain embodiments, the light source 710 emits light within the infrared spectrum while in other embodiments the light source 710 emits light within the visible spectrum. In certain embodiments, the light source 710 is configured to emit light in pulses. Although only one light source 710 is shown in FIG. 18, multiple light sources and/or one or more beam splitters or optical switches can be used with the measurement device 700 to generate multiple light beams. The emitted light is represented in FIG. 18 by reference number 720.

The first disk 712A and the second disk 712B can be configured to rotate independently of each other in the same or opposite direction and/or at the same or different speed. Each disk can be driven to rotate by a dedicated motor. For example, the motors can be coaxial and coupled directly or indirectly to a central portion or outer circumference of the respective disks.

Figure 19:
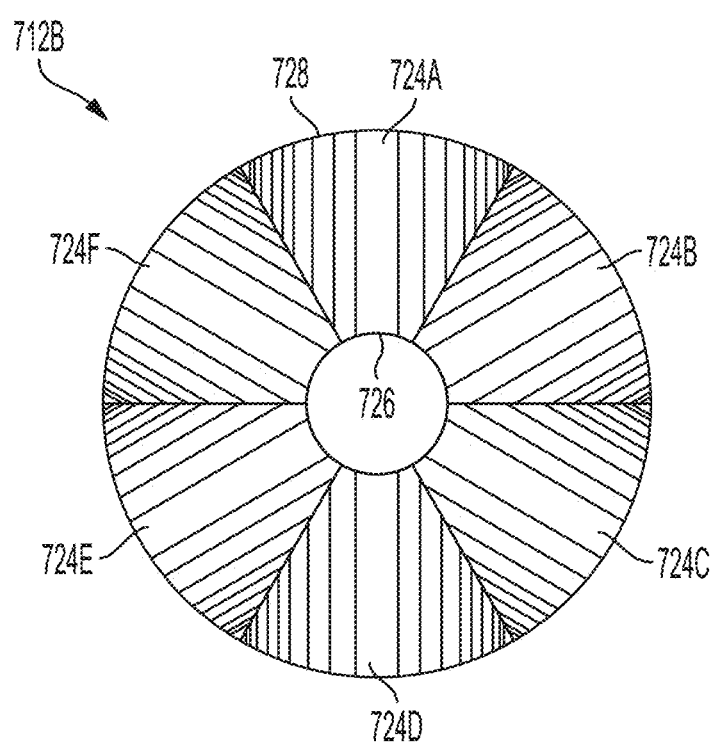
FIG. 19 shows a top view of one of the disks used in the measurement device of FIG. 18, in accordance with certain embodiments of the present disclosure.

The first disk 712A includes at least one set of prisms 722 similar to the disks described above. The second disk 712B is shown in FIG. 19 as including multiple sets of prisms 724A-F. Each set of prisms 724A-F can extend in different directions than each other. For example, the sets of prisms 724A-F are shown in FIG. 19 as extending radially outward between an inner portion 726 and an outer circumference 728 of the second disk 712B in six different sections. Each set of prisms 724A-F can be angled at the same or different prism angle as the other prisms. When the emitted light 720 passes through the second disk 712B, the emitted light 720 is steered onto the reflecting apparatus 714. In certain embodiments, the reflecting apparatus 714 is a stationary conical-shaped mirror, which diverges the emitted light 720 from the second disk 712B into a collimated beam. As the second disk 712B rotates and changes its angular position, the emitted light 720 is scanned back and forth across the field of view.

The emitted light 720 is transmitted out of the housing 702 of the measurement device 700 towards objects. A portion of the emitted light reflects off the objects and returns through the cover 706. This light, referred to as backscattered light, is represented in FIG. 18 by reference number 730 (not all of the backscattered light is associated with a reference number in FIG. 18). The backscattered light 730 is reflected by the reflecting apparatus 714 through the second disk 712B and then the first disk 712A towards the focusing apparatus 716.

The backscattered light 730 reflected by the reflecting apparatus 714 is focused by the focusing apparatus 716 towards the detector 718. For example, when the focusing apparatus 716 is a parabolic mirror, the parabolic mirror and the detector 718 can be positioned with respect to each other such that the parabolic mirror's focal point is at the detector 718. The particular shape, size, position, and orientation of the focusing apparatus 716 in the measurement device 700 can depend on, among other things, the position of the detector(s) 718, where the path(s) at which backscattered light 730 is directed within the housing 702, and space constraints of the measurement device 700.

The focusing apparatus 716 can focus the backscattered light 730 to one or more single detectors 718, such as photodetectors/sensors. In response to receiving the focused backscattered light, the detector 718 generates one or more sensing signals, which are ultimately used to detect the distance and/or shapes of objects that reflect the emitted light back towards the measurement device 700 and ultimately to the detector 718.

Figure 20:
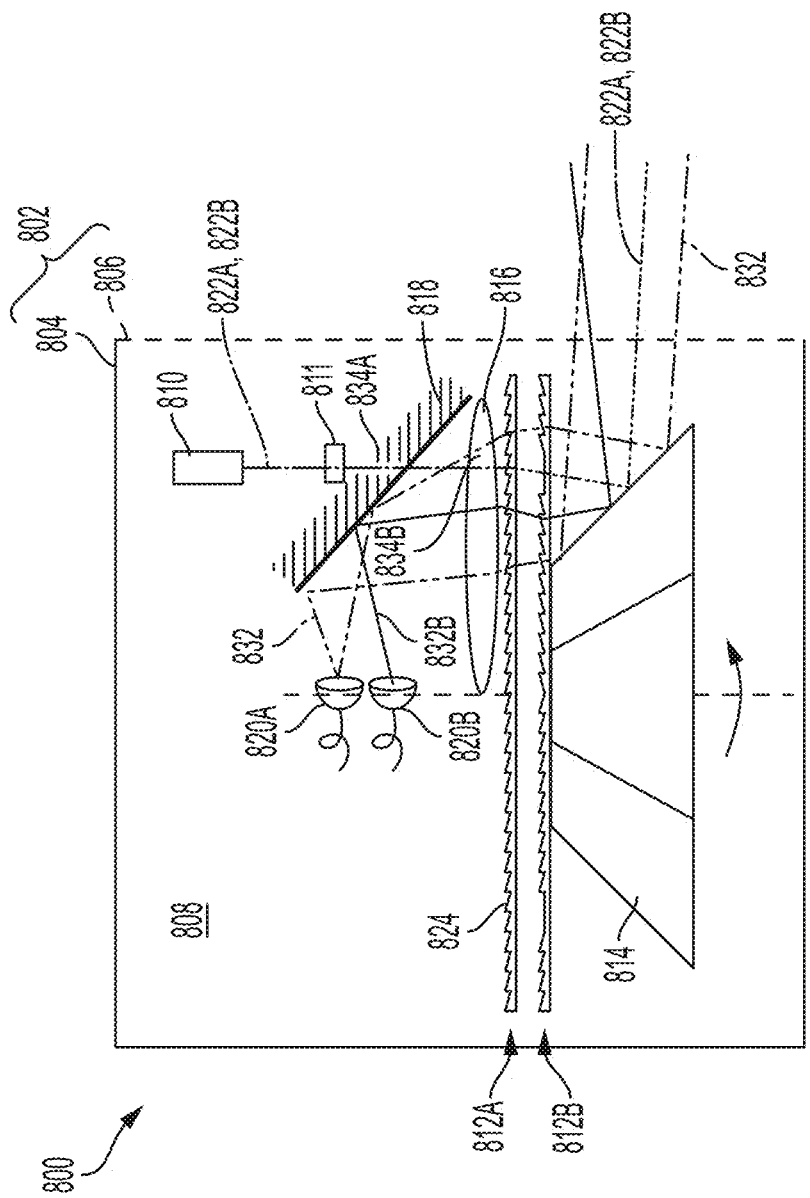
FIG. 20 shows a schematic, cut-away view of another measurement device, in accordance with certain embodiments of the present disclosure.

FIG. 20 shows a measurement device 800 including a housing 802 with a base member 804 and a transparent cover 806 that can be coupled together to surround an internal cavity 808 in which various components of the measurement device 800 are positioned. For simplicity, the housing 802 in FIG. 20 is shown with only the base member 804 and the cover 806, but the housing 802 can comprise any number of components that can be assembled together to create the internal cavity 808 and secure components of the measurement device 800.

The measurement device 800 includes a light source 810, a beam splitter 811, a first disk 812A (e.g., a rotatable disk such as the disk shown in FIGS. 1-3), a second disk 812B (e.g., a rotatable disk such as the disk shown in FIG. 21), a first reflecting apparatus 814 (e.g., a rotatable pyramidal-shaped mirror), a focusing apparatus 816 (e.g., a lens), a second reflecting apparatus 818 (e.g., a stationary mirror), a first detector 820A (e.g., a sensor), and a second detector 820B (e.g., a sensor). The various components of the measurement device 800 described below can include and/or incorporate materials, features, functions, etc., like similar components shown and described with respect to the measurement devices 100, 200, 300, 400, 500, 600, and 700. As such, although the description of the components of the measurement device 800 below is abbreviated, the components can include features described in more detail with respect to the measurement devices 100, 200, 300, 400, 500, 600, and 700.

The light source 810 can be a laser or a light-emitting diode. In certain embodiments, the light source 810 emits light within the infrared spectrum while in other embodiments the light source 810 emits light within the visible spectrum. In certain embodiments, the light source 810 is configured to emit light in pulses. Although only one light source 810 is shown in FIG. 20, multiple light sources can be used with the measurement device 800 to generate multiple light beams. The light emitted by the light source 810 is directed towards the beam splitter 811. The emitted light is represented in FIG. 20 by reference numbers 822A and 822B for light emitted from the light source 810 and separated into two beams by the beam splitter 811.

The first disk 812A and the second disk 812B can be configured to rotate independently of each other in the same or opposite direction and/or at the same or different speed. Each disk can be driven to rotate by a dedicated motor. For example, the motors can be coaxial and coupled directly or indirectly to a central portion or outer circumference of the respective disks. As shown in FIG. 20, in certain embodiments, the second disk 812B is directly coupled to the rotating mirror 814. As such, the second disk 812B and the rotating mirror 814 rotate together. In other embodiments, the second disk 812B is not directly coupled to the rotating mirror 814 and instead is positioned elsewhere within the emitted light's optical path. For example, the particular arrangement of the first disk 812A with respect to the second disk 812B can be modified from the arrangement shown in FIG. 20 without modifying the overall function of the second disk 812B. For example, the second disk 812B can rotate around an axis that is perpendicular to the rotational axis of the first disk 812A.

Figure 21:
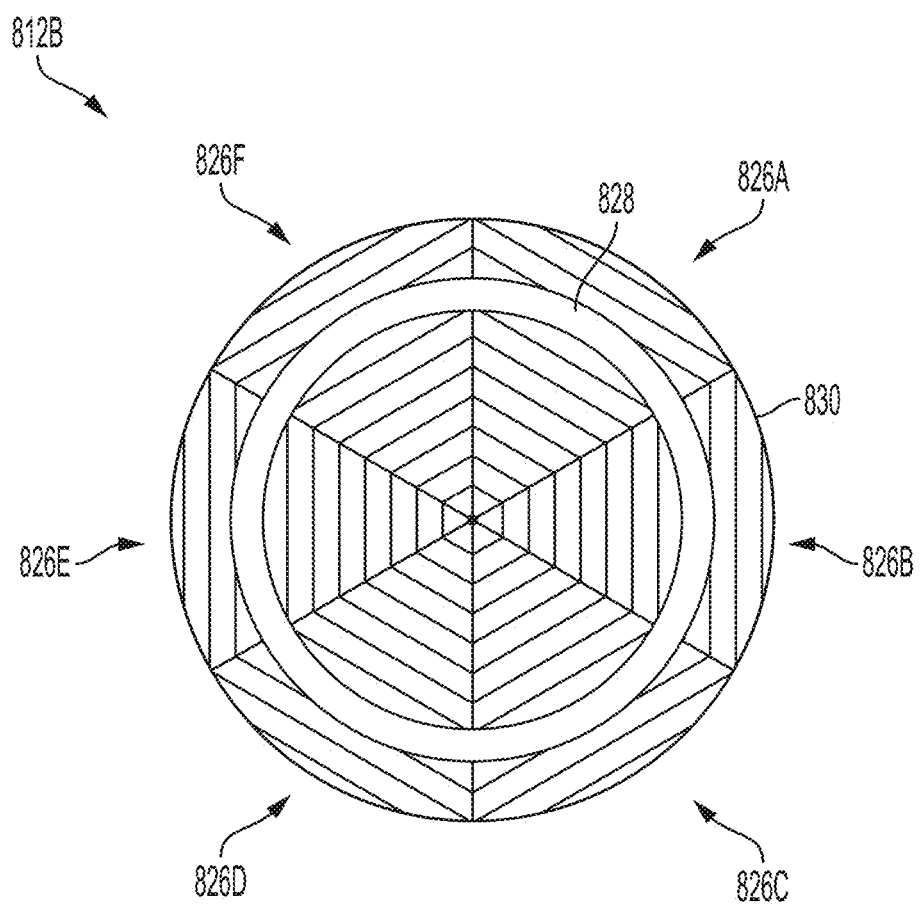
FIG. 21 shows a top view of one of the disks used in the measurement device of FIG. 20, in accordance with certain embodiments of the present disclosure.

The first disk 812A includes at least one set of prisms 824 similar to the disks described above. The second disk 812B is shown in FIG. 21 as including multiple sets of prisms 826A-F and an optional planar portion 828 (e.g., a prismless portion of the second disk 812B). Each set of prisms 826A-F can extend in different directions than each other. For example, the sets of prisms 826A-F are shown in FIG. 21 as extending radially outward to outer circumference 830 of the second disk 812B in six different sections. Each set of prisms 826A-F can be angled at the same or different prism angle as the other sets of prisms. As one non-limiting example, three sets of prisms (e.g., 826A, 826C, and 826E) can be angled at 10 degrees while the three other sets of prisms (e.g., 826B, 826D, and 826F) can be angled at 12 degrees. As such, in this one example, the sets of prisms 826A-F alternate between two different angles. Alternatively or additionally, as described above, the facets of the rotating mirror 814 can be angled at different angles for a similar effect.

When the emitted light 822A and 822B passes through the second disk 812B, the emitted light 822A and 822B is steered onto the rotating mirror 814. The rotating mirror 814 comprises a plurality of facets/faces 832A-F that include or otherwise incorporate a reflective surface such as a mirror. In certain embodiments, the number of different sets of prisms 826A-F are the same number of facets 832A-F on the rotating mirror 814.

One concern with using a single light source 810 is that the emitted light when split (e.g., via a beam splitter) is scanned across two facets at the same point in time and is then collected across an area that is shared between two facets as the rotating mirror 814 rotates. For example, for a six-faceted rotating mirror 814, two adjacent facets will occupy up to 60 degrees of the same collection area at a given point in time. As such, unless accounted for using techniques such as wavelength separation or multiple light beams, the two facets will share a single detector.

One approach to address this concern is to incorporate the second disk 812B as shown in FIG. 21. The second disk 812B includes the planar portion 828, which helps keep the paths of the emitted light 822A and 822B from deviating. Further, the sets of prisms 826A-F are angled in an alternative fashion, which separates the backscattered light paths from two different facets. In such an arrangement, the second disk 8128 should be phase-locked to the rotating mirror 814 (e.g., via mechanically fixing the second disk 812B to the rotating mirror 814, via using a separate motor to rotate the second disk 812B that is phase-locked to the motor rotating the rotating mirror 814). The alternating prism angles of the sets of prisms 826A-F will separate backscattered light for two facets of the rotating mirror 814. As such, when the emitted light 822A and 822B from a single light source 810 is split into separate paths and sent to two different facets, the backscattered light can be disambiguated through the use of two separate detectors 820A and 820B.

The emitted light 822A and 822B is transmitted out of the housing 802 of the measurement device 800 towards objects. A portion of the emitted light reflects off the objects and returns through the cover 806. This light, referred to as backscattered light, is represented in FIG. 20 by reference number 832 (not all of the backscattered light is associated with a reference number in FIG. 20). The backscattered light 832 is reflected by the rotating mirror 814 through the second disk 812B, then the first disk 812A, and then the focusing apparatus 816 towards the stationary mirror 818. As shown in FIG. 20, both the focusing apparatus 816 and the stationary mirror 818 includes apertures 834A, 834B through which the emitted light 822A and 822B can pass towards the first disk 812A.

The backscattered light 832 reflected by the stationary mirror 818 is reflected towards the detectors 820A and 820B. The particular shape, size, position, and orientation of the focusing apparatus 816 and the stationary mirror 818 in the measurement device 800 can depend on, among other things, the position of the detector(s) 820A and 820B, where the path(s) at which backscattered light 832 is directed within the housing 802, and space constraints of the measurement device 800.

In response to receiving the backscattered light 832, the detectors 820A and 820B generate one or more sensing signals, which are ultimately used to detect the distance and/or shapes of objects that reflect the emitted light back towards the measurement device 800 and ultimately to the detectors 820A and 820B.

Figure 22A:
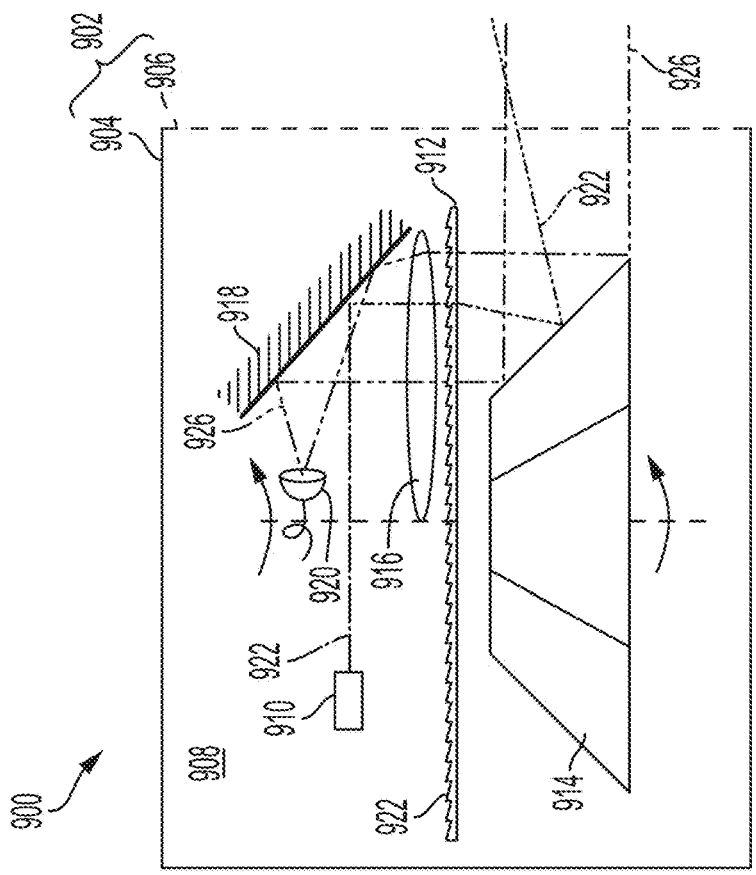
FIGS. 22A and 22B show schematic, cut-away views of another measurement device showing alternative arrangements of optical elements within the measurement device, in accordance with certain embodiments of the present disclosure.
Figure 22B:
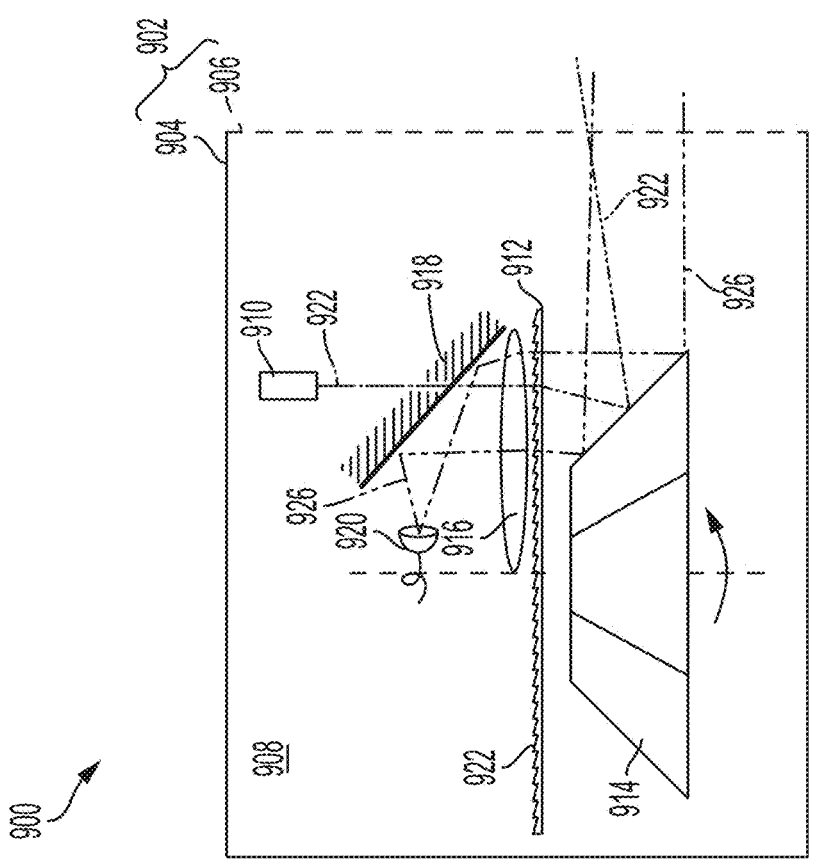

FIGS. 22A and 22B show a measurement device 900 with two alternative arrangements of the various optical elements of the measurement device 900. These Figures show that the optical elements shown and described above can have different physical arrangements than the arrangements specifically shown in the Figures.

The measurement device 900 includes a housing 902 with a base member 904 and a transparent cover 906 that can be coupled together to surround an internal cavity 908 in which various components of the measurement device 900 are positioned. For simplicity, the housing 902 in FIGS. 22A and 22B is shown with only the base member 904 and the cover 906, but the housing 902 can comprise any number of components that can be assembled together to create the internal cavity 908 and secure components of the measurement device 900.

The measurement device 900 includes a light source 910, a disk 912 (e.g., a rotatable disk such as the disk shown in FIGS. 1-3), a first reflecting apparatus 914 (e.g., a rotatable pyramidal-shaped mirror), a second reflecting apparatus 916 (e.g., a stationary mirror), a focusing apparatus 918 (e.g., a lens; a curved mirror such as a parabolic mirror), and a detector 920 (e.g., a sensor). The components of the measurement device 900 described below can include and/or incorporate materials, features, functions, etc., like similar components shown and described with respect to the measurement devices 100, 200, 300, 400, 500, 600, 700, and 800. As such, although the description of the components of the measurement device 900 below is abbreviated, the components can include features described in more detail with respect to the measurement devices 100, 200, 300, 400, 500, 600, 700, and 800.

The light source 910 can be a laser or a light-emitting diode. In certain embodiments, the light source 910 emits light within the infrared spectrum while in other embodiments the light source 910 emits light within the visible spectrum. In certain embodiments, the light source 910 is configured to emit light in pulses. Although only one light source 910 is shown in FIGS. 22A and 22B, multiple light sources can be used with the measurement device 900 to generate multiple light beams/paths. Further, multiple light beams/paths can be created using beam splitters and/or optical switches. The emitted light is represented in FIGS. 22A and 22B by reference number 922.

As shown in FIGS. 22A and 22B, the light source 910 can have different positions and orientations within the measurement device. In FIG. 22A, the light source 910 is positioned and oriented such that the emitted light 922 is directed towards the disk 912 parallel to an axis of rotation of the disk 912 and without any type of reflector positioned within the optical path between the light source 910 and the disk 912. In FIG. 22B, the light source 910 is positioned and oriented such that the emitted light 922 is initially directed perpendicular to the the axis of rotation of the disk 912 and with the stationary mirror 916 positioned in the optical path between the light source 910 and the disk 912. The stationary mirror 916 in FIG. 22B reflects the emitted light 922 towards the disk 912.

The stationary mirror 916 can be a front surface mirror that is angled and positioned to reflect the emitted light 922 (in the arrangement in FIG. 22B) and backscattered light in the arrangements of FIGS. 22A and 22B. Although the stationary mirror 916 is shown as having an angle of approximately 45 degrees, other angles can be used. The stationary mirror 916 can include an aperture to permit the emitted light 922 from the light source 910 to pass through the stationary mirror 916 in the arrangement of FIG. 22A.

The disk 912 includes at least one set of prisms 924. The measurement device 900 can include a motor that rotates the disk 912. As the disk 912 rotates, the emitted light 922 is deflected in a cone pattern resulting in a circle. The emitted light 922 deflected by the disk 912 is then directed towards the rotating mirror 914. The rotating mirror 914 is coupled to a motor that rotates the rotating mirror 914 during operation of the measurement device 900.

The rotating mirror 914 comprises a plurality of facets/faces that include or otherwise incorporate a reflective surface such as a mirror. The disk 912 and the rotating mirror 914 can be used to create light patterns such as the light pattern 136A, 136B shown in FIGS. 6A and 6B. The emitted light 922 is transmitted out of the housing 902 of the measurement device 900 towards objects. A portion of the emitted light reflects off the objects and returns through the cover 906. This light, referred to as backscattered light, is represented in FIGS. 22A and 22B by reference number 926 (not all of the backscattered light is associated with a reference number in FIGS. 22A and 22B). The backscattered light 926 is reflected by the rotating mirror 914 and then passes through the disk 912 and towards the focusing apparatus 918.

The focusing apparatus 918 is an optical element such as a lens that focuses the backscattered light 926 towards the stationary mirror 916 and ultimately to the detector 920. The focused backscattered light 926 is reflected by the stationary mirror 916 towards the detector 920. The particular shape, size, position, and orientation of the focusing apparatus 918 in the measurement device 900 can depend on, among other things, the position of the detector(s) 920, where the path(s) at which backscattered light 926 is directed within the housing 902, and space constraints of the measurement device 900. In both arrangements of FIGS. 22A and 22B, the focusing apparatus 918 includes an aperture to allow the emitted light 922 to pass through the focusing apparatus 918 towards the disk 912.

In response to receiving the focused backscattered light, the detector 920 generates one or more sensing signals, which are ultimately used to detect the distance and/or shapes of objects that reflect the emitted light back towards the measurement device 900 and ultimately to the detector 920.

FIG. 23 shows a measurement device 1000 including a housing 1002 with a base member 1004 and a transparent cover 1006 that can be coupled together to surround an internal cavity 1008 in which various components of the measurement device 1000 are positioned. For simplicity, the housing 1002 in FIG. 23 is shown with only the base member 1004 and the cover 1006, but the housing 1002 can comprise any number of components that can be assembled together to create the internal cavity 1008 and secure components of the measurement device 1000.

The measurement device 1000 includes a light source 1010, a disk 1012 (e.g., a rotatable disk such as the disk shown in FIGS. 1-3), a reflecting apparatus 1014 (e.g., a rotatable pyramidal-shaped mirror), a focusing apparatus 1016 (e.g., a lens; a curved mirror such as a parabolic mirror), and a detector 1018 (e.g., a sensor). The components of the measurement device 1000 described below can include and/or incorporate materials, features, functions, etc., like similar components shown and described with respect to the measurement devices 100, 200, 300, 400, 500, 600, 700, 800, and 900. As such, although the description of the components of the measurement device 1000 below is abbreviated, the components can include features described in more detail with respect to the measurement devices 100, 200, 300, 400, 500, 600, 700, 800, and 900.

The light source 1010 can be a laser or a light-emitting diode. In certain embodiments, the light source 1010 emits light within the infrared spectrum while in other embodiments the light source 1010 emits light within the visible spectrum. In certain embodiments, the light source 1010 is configured to emit light in pulses. Although only one light source 1010 is shown in FIG. 23, multiple light sources can be used with the measurement device 1000 to generate multiple light beams. Further, multiple light beams/paths can be created using beam splitters and/or optical switches. The emitted light is represented in FIG. 23 by reference number 1020. The light source 1010 is positioned and oriented such that the emitted light 1020 is directed towards the disk 1012 parallel to an axis of rotation of the disk 1012 and without any type of reflector between the light source 1010 and the disk 1012.

The disk 1012 includes at least one set of prisms 1022. The measurement device 1000 can include a motor that rotates the disk 1012. As the disk 1012 rotates, the emitted light 1020 is deflected in a cone pattern resulting in a circle. The emitted light 1020 deflected by the disk 1012 is then directed towards the rotating mirror 1014. The rotating mirror 1014 is coupled to a motor that rotates the rotating mirror 1014 during operation of the measurement device 1000.

The rotating mirror 1014 comprises a plurality of facets/faces that include or otherwise incorporate a reflective surface such as a mirror. The disk 1012 and the rotating mirror 1014 can be used to create light patterns such as the light pattern 136A, 136B shown in FIGS. 6A and 6B. The emitted light 1020 is transmitted out of the housing 1002 of the measurement device 1000 towards objects. A portion of the emitted light reflects off the objects and returns through the cover 1006. This light, referred to as backscattered light, is represented in FIG. 23 by reference number 1024 (not all of the backscattered light is associated with a reference number in FIG. 23). The backscattered light 1024 is reflected by the rotating mirror 1014 through the disk 1012 and towards the focusing apparatus 1016.

The focusing apparatus 1016 is an optical element such as a lens that focuses the backscattered light 1024 towards the detector 1018. The particular shape, size, position, and orientation of the focusing apparatus 1016 in the measurement device 1000 can depend on, among other things, the position of the detector(s) 1018, where the path(s) at which backscattered light 1024 is directed within the housing 1002, and space constraints of the measurement device 1000. The focusing apparatus 1016 includes an aperture to allow the emitted light 1020 to pass through the focusing apparatus 1016 towards the disk 1012.

In response to receiving the focused backscattered light, the detector 1020 generates one or more sensing signals, which are ultimately used to detect the distance and/or shapes of objects that reflect the emitted light back towards the measurement device 1000 and ultimately to the detector 1018. As shown in FIG. 23, the detector 1020 is oriented along or parallel to the axis of rotation of the rotating mirror 1014. Further, the focusing apparatus 1016 is shown as being larger compared to lenses shown in other measurement devices.

FIG. 24 shows a measurement device 1100 includes a housing 1102 with a base member 1104 and a transparent cover 1106 that can be coupled together to surround an internal cavity 1108 in which various components of the measurement device 1100 are positioned. For simplicity, the housing 1102 in FIG. 24 is shown with only the base member 1104 and the cover 1106, but the housing 1102 can comprise any number of components that can be assembled together to create the internal cavity 1108 and secure components of the measurement device 1100.

The measurement device 1100 includes multiple light sources 1110A and 11108, a disk 112 (e.g., a rotatable disk such as the disk shown in FIGS. 1-3), a first reflecting apparatus 1114 (e.g., a rotatable pyramidal-shaped mirror), a second reflecting apparatus 1116 (e.g., a stationary mirror), a focusing apparatus 1118 (e.g., a lens; a curved mirror such as a parabolic mirror), and a detector 1120 (e.g., a sensor). The components of the measurement device 1100 described below can include and/or incorporate materials, features, functions, etc., like similar components shown and described with respect to the measurement devices 100, 200, 300, 400, 500, 600, 700, 800, 900, and 1000. As such, although the description of the components of the measurement device 1100 below is abbreviated, the components can include features described in more detail with respect to the measurement devices 100, 200, 300, 400, 500, 600, 700, 800, 900, and 1000.

The light sources 1110A and 11108 can be lasers or light-emitting diodes. In certain embodiments, the light sources 1110A and 11108 emit light within the infrared spectrum while in other embodiments the light sources 1110A and 11108 emit light within the visible spectrum. In certain embodiments, the light sources 1110A and 11108 are configured to emit light in pulses. The emitted light is represented in FIG. 24 by reference numbers 1122A and 11228. In certain embodiments, the light sources 1110A and 11108 are oriented such that the emitted light 1122A and 1122B is directed in non-parallel directions towards the stationary mirror 1116. The stationary mirror 1116 reflects the emitted light 1122A and 1122B towards the disk 1112. Although the stationary mirror 1116 is shown as having an angle of approximately 45 degrees, other angles can be used.

The disk 1112 includes at least one set of prisms 1124. The measurement device 1100 can include a motor that rotates the disk 1112. As the disk 1112 rotates, the emitted light 1122A and 1122B is deflected in separate cone patterns resulting in separate circles. The emitted light 1122A and 1122B deflected by the disk 1112 is then directed towards the rotating mirror 1114. The rotating mirror 1114 is coupled to a motor that rotates the rotating mirror 1114 during operation of the measurement device 1100.

The rotating mirror 1114 comprises a plurality of facets/faces that include or otherwise incorporate a reflective surface such as a mirror. The disk 1112 and the rotating mirror 1114 can be used to create light patterns such as the light pattern 136A, 136B shown in FIGS. 6A and 6B. The emitted light 1122A and 1122B is transmitted out of the housing 1102 of the measurement device 1100 towards objects. A portion of the emitted light reflects off the objects and returns through the cover 1106. This light, referred to as backscattered light, is represented in FIG. 24 by reference number 1126 (not all of the backscattered light is associated with a reference number in FIG. 24). The backscattered light 1126 is reflected by the rotating mirror 1114 through the disk 1112 and towards the focusing apparatus 1118.

The focusing apparatus 1118 is an optical element such as a lens that focuses the backscattered light 1126 towards the stationary mirror 1114 and ultimately to the detector 1120. The focused backscattered light 1126 is reflected by the stationary mirror 1114 towards the detectors 1120A and 1120B. The particular shape, size, position, and orientation of the focusing apparatus 1116 in the measurement device 1100 can depend on, among other things, the position of the detector(s) 1120A and 1120B, where the path(s) at which backscattered light 1126 is directed within the housing 1102, and space constraints of the measurement device 1100. The focusing apparatus 1118 includes an aperture to allow the emitted light 1122A and 1122B to pass through the focusing apparatus 1118 towards the disk 1112.

In response to receiving the focused backscattered light, the detectors 1120A and 1120B generates one or more sensing signals, which are ultimately used to detect the distance and/or shapes of objects that reflect the emitted light back towards the measurement device 1100 and ultimately to the detectors 1120A and 1120B.

In certain embodiments, the measurement devices described above are incorporated into measurement systems such that the systems include one or more measurement devices. For example, a measurement system for an automobile may include multiple measurement devices, each installed at different positions on the automobile to generate scanning light patterns and detect backscattered light in a particular direction of the automobile. Each measurement device may include circuitry for processing the detected backscattered light and generating signals indicative of the detected backscattered light, which may be used by measurement systems to determine information about objects in the measurement devices' fields of view.

Various methods can be carried out in connection with the measurement devices described above. As one example, a method for generating a scanning light pattern using various measurements devices described above includes rotating a disk having prisms; rotating a reflecting apparatus having multiple reflective facets; directing light from a light source through the rotating disk to create a first light pattern; and reflecting, via the rotating reflecting apparatus, the first light to generate the scanning light pattern described above and schematically shown in various figures. Components of the other measurement devices described herein can be used in various methods to generate scanning light patterns and detect backscattered light from the scanning light patterns.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An apparatus comprising:
   a detector;
   a light source configured to emit light;
   a disk having a set of prisms, being configured to rotate around a rotation axis, arranged to receive and direct the emitted light, and arranged to receive and direct backscattered light;
   a reflecting apparatus having multiple reflective facets, being configured to rotate around the rotation axis or an axis that is parallel to the rotation axis, arranged to reflect the emitted light, and arranged to reflect the backscattered light; and
   a focusing apparatus arranged to focus the backscattered light from the disk towards the detector.

2. The apparatus of claim 1, wherein the focusing apparatus is a curved mirror or a lens.

3. The apparatus of claim 1, wherein the focusing apparatus is a curved mirror, the apparatus further comprising:
   a lens arranged to focus the backscattered light reflected by the curved mirror towards the detector.

4. The apparatus of claim 1, further comprising:
a stationary flat surface mirror arranged to reflect the backscattered light from the disk towards a lens, the lens arranged to focus the backscattered light towards the detector.

5. The apparatus of claim 1, wherein the focusing apparatus includes an aperture through which the emitted light passes.

6. The apparatus of claim 1, wherein the detector is a single detector.

7. The apparatus of claim 1, further comprising:
a reflector arranged to reflect light from the light source towards the plurality of disks.

8. The apparatus of claim 7, wherein the reflector is a rotatable mirror.

9. The apparatus of claim 1, further comprising:
a beam splitter configured to split the emitted light from the light into a number of separate light beams, wherein each of the number of beams is directed to different reflective facets of the reflecting apparatus at a given position of the reflecting apparatus.

10. The apparatus of claim 9, wherein the apparatus comprises a plurality of detectors equal in number to the number of separate light beams created by the beam splitter.

11. The apparatus of claim 7, wherein the reflector is a stationary mirror.

12. The apparatus of claim 1, wherein the disk includes multiple sets of prisms each with prisms having different prism angles from the other sets of prisms.

13. The apparatus of claim 1, further comprising:
a housing including a base member and a transparent cover that at least partially encompass an internal cavity,
wherein the detector, the light source, the disk, and the focusing apparatus are positioned within the internal cavity.

14. A method for generating a scanning light pattern, the method comprising:
rotating a disk around a rotation axis, the disk having prisms;
rotating a reflecting apparatus around the rotation axis or an axis parallel to the rotation axis, the reflecting apparatus having multiple reflective facets;
directing light from a light source through the rotating disk to create a first light pattern; and
reflecting, via the rotating reflecting apparatus, the first light to generate the scanning light pattern.

15. The method of claim 14, further comprising:
receiving, at a detector, backscattered light of the generated scanning light pattern that is reflected by the rotating reflecting apparatus and that passes through the disk.

16. The method of claim 15, further comprising:
focusing, with a focusing apparatus, the backscattered light that has been reflected by the rotating reflecting apparatus and that has passed through the disk towards the detector.

17. An apparatus comprising:
a detector;
a light source configured to emit light;
a first disk having a single set of prisms, being configured to rotate, arranged to receive and direct the emitted light, and arranged to receive and direct backscattered light;
a second disk having multiple sets of prisms, being configured to rotate, arranged to receive and direct the emitted light, and arranged to receive and direct backscattered light, each of the multiple sets of prisms having a different prism angle compared to the other sets of prisms;
a stationary reflecting apparatus arranged to reflect the emitted light and arranged to reflect the backscattered light; and
a focusing apparatus arranged to focus the backscattered light towards the detector.

18. The apparatus of claim 17, wherein the multiple sets of prisms on the second disk each have the same area of the other sets of prisms.

19. The apparatus of claim 1, wherein the light source is configured to emit light along an axis that is parallel to the rotation axis.

20. The apparatus of claim 1, wherein the disk having the set of prisms is a single disk and the only disk comprising prisms within the apparatus.

* * * * *